US012601173B2

(12) United States Patent
Collins et al.

(10) Patent No.: US 12,601,173 B2
(45) Date of Patent: Apr. 14, 2026

(54) MULTI-STORY BUILDING HAVING PREFABRICATED STAIR AND ELEVATOR MODULES

(71) Applicant: Innovative Building Technologies, LLC, Seattle, WA (US)

(72) Inventors: Arlan E. Collins, Seattle, WA (US); Mark L. Woerman, Seattle, WA (US); Mark D'Amato, Seattle, WA (US); Eric P. Hinckley, Superior, CO (US); Calder Danz, Seattle, WA (US); Christopher J. Allen, Aloha, OR (US); Dale V. Paul, Poulsbo, WA (US)

(73) Assignee: Innovative Building Technologies, LLC, Seattle, WA (US)

( * ) Notice: Subject to any disclaimer, the term of this patent is extended or adjusted under 35 U.S.C. 154(b) by 140 days.

(21) Appl. No.: 18/249,499

(22) PCT Filed: Oct. 21, 2021

(86) PCT No.: PCT/US2021/056081
§ 371 (c)(1),
(2) Date: Apr. 18, 2023

(87) PCT Pub. No.: WO2022/087287
PCT Pub. Date: Apr. 28, 2022

(65) Prior Publication Data

US 2023/0417046 A1 Dec. 28, 2023

Related U.S. Application Data

(60) Provisional application No. 63/178,515, filed on Apr. 22, 2021, provisional application No. 63/104,239, filed on Oct. 22, 2020.

(51) Int. Cl.
*E04B 5/04* (2006.01)
*B66B 11/00* (2006.01)
(Continued)

(52) U.S. Cl.
CPC ............ *E04B 5/04* (2013.01); *B66B 11/0005* (2013.01); *B66B 19/00* (2013.01); *E04B 1/02* (2013.01);
(Continued)

(58) Field of Classification Search
CPC ..... E04B 5/04; E04B 5/10; E04B 5/02; E04B 1/02; E04B 1/08; E04B 1/24;
(Continued)

(56) References Cited

U.S. PATENT DOCUMENTS 3,818,660 A 6/1974 Dillon
5,402,608 A 4/1995 Chu
(Continued)

FOREIGN PATENT DOCUMENTS

GB 2446878 8/2008
WO 2020101735 5/2020

OTHER PUBLICATIONS

USPTO, Written Opinion for International Patent Application No. PCT/US2021/056081, Jan. 31, 2022, 8 pages.
(Continued)

*Primary Examiner* — Paola Agudelo
(74) *Attorney, Agent, or Firm* — IP Spring

(57) ABSTRACT

A building includes a prefabricated modular stair or elevator module. The prefabricated stair or elevator module may form either a fully functional stairwell with an internally supported internal landing and handrails, or a fully functional elevator shaft ready to install an elevator system through a plurality of engagement features. Each prefabricated stair/elevator module includes four vertical members extending orthogonally from a reference plane, four transverse members forming transverse edges of the module, and four longitudinal members forming longitudinal edges of the module. The prefabricated modules may be stacked upon
(Continued)

one another and fixedly attached to one another through fastening members and fasteners. Furthermore, each module may be covered in wall panels such that each module forms a segment of either an elevator shaft or a stairwell.

19 Claims, 26 Drawing Sheets

(51) Int. Cl.

| | |
|---|---|
| ***B66B 19/00*** | (2006.01) |
| ***E04B 1/02*** | (2006.01) |
| ***E04B 1/08*** | (2006.01) |
| ***E04B 1/24*** | (2006.01) |
| ***E04B 1/348*** | (2006.01) |
| ***E04B 1/61*** | (2006.01) |
| ***E04B 2/60*** | (2006.01) |
| ***E04B 5/10*** | (2006.01) |
| ***E04B 9/00*** | (2006.01) |
| ***E04B 9/04*** | (2006.01) |
| *E04B 5/02* | (2006.01) |

(52) U.S. Cl.
CPC .................. *E04B 1/08* (2013.01); *E04B 1/24* (2013.01); *E04B 1/2403* (2013.01); *E04B 1/3483* (2013.01); *E04B 1/34869* (2013.01); *E04B 1/612* (2013.01); *E04B 1/6125* (2013.01); *E04B 2/60* (2013.01); *E04B 5/10* (2013.01); *E04B 9/008* (2013.01); *E04B 9/04* (2013.01); *E04B 2001/2415* (2013.01); *E04B 2001/2418* (2013.01); *E04B 2001/2451* (2013.01); *E04B 2001/2481* (2013.01); *E04B 2001/6191* (2013.01); *E04B 2001/6195* (2013.01); *E04B 5/02* (2013.01); *E04B 2103/06* (2013.01)

(58) Field of Classification Search
CPC ...... E04B 1/2403; E04B 1/3483; E04B 1/612; E04B 1/6125; E04B 2/60; B66B 11/0005
USPC .............................................................. 52/30
See application file for complete search history.

(56) References Cited

U.S. PATENT DOCUMENTS

| | | | | |
|---|---|---|---|---|
| 5,644,871 | A * | 7/1997 | Cohen | E04B 5/04 52/125.4 |
| 6,959,515 | B1 * | 11/2005 | Beighton | E04B 1/3483 52/236.7 |
| 7,941,984 | B2 * | 5/2011 | Roig | E04B 1/34838 52/634 |
| 8,186,109 | B2 * | 5/2012 | Warminsky | E04H 9/10 52/79.5 |
| 8,276,328 | B2 * | 10/2012 | Pepin | E04C 2/386 52/657 |
| 8,356,446 | B2 * | 1/2013 | Takeda | E04B 1/5831 52/762 |
| 10,253,465 | B2 * | 4/2019 | Preston | E01D 18/00 |
| 2012/0073214 | A1 * | 3/2012 | Sie | E04F 17/005 52/274 |
| 2013/0211795 | A1 * | 8/2013 | Vanker | E04B 1/08 703/1 |
| 2014/0083046 | A1 * | 3/2014 | Yang | E04B 1/2403 52/704 |
| 2015/0308096 | A1 * | 10/2015 | Merhi | E04G 21/14 52/745.1 |
| 2016/0017609 | A1 * | 1/2016 | Bottin | E04H 1/005 52/302.1 |
| 2016/0040443 | A1 * | 2/2016 | Stephenson | E04H 1/005 52/79.5 |
| 2017/0284095 | A1 * | 10/2017 | Collins | E04C 2/322 |
| 2018/0355601 | A1 * | 12/2018 | Collins | E04B 1/24 |
| 2019/0010693 | A1 * | 1/2019 | Powers | E04H 15/001 |
| 2019/0112159 | A1 * | 4/2019 | Cambruzzi | B66B 19/007 |
| 2019/0169844 | A1 * | 6/2019 | Yousefi Darestani | E04B 1/167 |
| 2019/0323235 | A1 * | 10/2019 | Benson | E04C 3/34 |
| 2020/0039786 | A1 * | 2/2020 | Kamada | B66B 11/0005 |
| 2020/0123761 | A1 | 4/2020 | Garcia-Abril Ruiz et al. | |
| 2020/0217087 | A1 * | 7/2020 | Greschbach | B66B 11/0005 |
| 2023/0061113 | A1 * | 3/2023 | Keller | E04B 2/56 |

OTHER PUBLICATIONS

USPTO, International Search Report for International Patent Application No. PCT/US2021/056081, Jan. 31, 2022, 2 pages.

* cited by examiner

MULTI-STORY BUILDING HAVING PREFABRICATED STAIR AND ELEVATOR MODULES

CROSS-REFERENCE TO RELATED APPLICATIONS

The present application is the U.S. national phase filing under 35 U.S.C. § 371 of International Patent Application No. PCT/US2021/056081, filed Oct. 21, 2021, which is a claims priority under 35 U.S.C. § 119 (e) and/or under PCT Article 8 to U.S. Provisional Patent Application No. 63/104,239, filed on Oct. 22, 2020, and entitled "LOAD BEARING WALLS FOR A BUILDING" and to U.S. Provisional Patent Application No. 63/178,515, filed on Apr. 22, 2021, and entitled "LOW-MID RISE BUILDING HAVING LOAD BEARING WALLS, UTILITY WALLS, AND A CORRIDOR SYSTEM, AND OTHER ACCOMPANYING STRUCTURE, AND METHOD TO CONSTRUCT THE BUILDING." The entire contents of U.S. Provisional Patent Application Nos. 63/104,239 and 63/178,515 are hereby incorporated by reference herein.

The present application is related in subject matter to each of the following applications, each of which shares a common international filing date of Oct. 21, 2021 as the present application, entitled "MULTI-STORY BUILDING HAVING LOAD BEARING WALLS AND METHOD TO CONSTRUCT THE BUILDING" International Patent Application No. PCT/US2021/056091), "MULTI-STORY BUILDING HAVING PODIUM LEVEL STEEL TRANSFER STRUCTURE" International Patent Application No. PCT/US2021/056074), "PRE-MANUFACTURED FLOOR-CEILING PANEL FOR A MULTI-STORY BUILDING HAVING LOAD BEARING WALLS" International Patent Application No. PCT/US2021/056076), "PRE-MANUFACTURED UTILITY WALL FOR A MULTI-STORY BUILDING HAVING LOAD BEARING WALLS" International Patent Application No. PCT/US2021/056079), "PRE-MANUFACTURED FLOOR-CEILING CORRIDOR PANEL FOR A MULTI-STORY BUILDING HAVING LOAD BEARING WALLS" International Patent Application No. PCT/US2021/056080), "PRE-MANUFACTURED LOAD BEARING WALLS FOR A MULTI-STORY BUILDING" International Patent Application No. PCT/US2021/056077), and "PRE-MANUFACTURED FLOOR-CEILING DRAG ANCHOR FOR A MULTI-STORY BUILDING HAVING LOAD BEARING WALLS" International Patent Application No. PCT/US2021/056086), all of which are hereby incorporated by reference herein, in their respective entireties.

BACKGROUND

Conventional construction is typically conducted in the field at the building job site. People in various trades (e.g., carpenters, electricians, and plumbers) measure, cut, and install material as though each unit were one-of-a-kind. Furthermore, activities performed by the trades are arranged in a linear sequence. The result is a time-consuming process that increases the risk of waste, installation imperfections, and cost overruns.

Traditional building construction continues to be more and more expensive and more and more complex. Changing codes, changing environments, and new technology have all made the construction of a building more complex than it was 10 or more years ago. In addition, trade labor availability is being reduced significantly. As more and more craftsmen retire, fewer and fewer younger workers may be choosing the construction industry as a career, leaving the construction industry largely lacking in skilled and able men and women to do the growing amount of construction work.

The construction industry is increasingly using modular construction techniques to improve efficiency. Modular construction techniques may include pre-manufacturing complete volumetric units (e.g., a stackable module) or one or more building components, such as wall panels, floor panels, and/or ceiling panels, offsite (e.g., in a factory or manufacturing facility), delivering the pre-manufactured modules or components to a building construction site, and assembling the pre-manufactured modules or components at the building construction site.

While modular construction techniques provide certain advantages over traditional construction techniques, challenges continue to exist in being able meet housing and other building demands in communities. For example, the construction industry, whether using modular construction techniques or traditional construction techniques, needs to be able to address issues such as reducing construction costs and construction waste, reducing time-to-build, providing building designs that efficiently use space, and other challenges brought on by increasing demands for affordable housing and other building needs.

SUMMARY

Implementations of this application relate to stair and/or elevator modules that may be used in construction of a building or edifice. Various aspects are disclosed herein.

In one aspect, A prefabricated stairwell and elevator shaft module, comprising: four vertical members arranged orthogonal to a reference ground plane based on a foundation of a multi-story building; four transverse members fixedly attached to upper and lower distal ends of the four vertical members with corner support members; four longitudinal members fixedly attached to upper and lower distal ends of the four vertical members with the corner support members; wherein the four vertical members, four transverse members, and four longitudinal members form side edges of the module and define an interior space configured to form a segment of one or more of an elevator shaft and a stairwell, the segment having a height corresponding to a single story of the multi-story building, the segment configured to communicate between stories of the multi-story building, and the segment being a self-supporting structure; wherein the corner support members each comprise at least one anchor hole configured to receive and engage with a lifting hook for lifting and placement of the prefabricated stairwell and elevator shaft module at a construction site for the multi-story building.

In some implementations, the prefabricated stairwell and elevator shaft module is prefabricated at a manufacturing facility separate from the construction site for the multi-story building.

In some implementations, the segment of the elevator shaft comprises one or more engagement features configured to engage and retain elevator system components.

In some implementations, the elevator system components comprise at least one elevator rail and at least one elevator counterweight.

In some implementations, the corner support members comprise three L-brackets configured to attach to exterior surfaces of two proximate members of the vertical members, transverse members, and longitudinal members.

In some implementations, the prefabricated stairwell and elevator shaft module is a first module, and wherein the first module is configured to align and stack upon a second prefabricated stairwell and elevator shaft module.

In some implementations, the first module is configured to attach to the second module with one or more transverse support members, wherein each transverse support member is formed from a continuous piece of metal having through holes formed therein.

In some implementations, the first module is configured to attach to the second module with one or more longitudinal support members, wherein each longitudinal support member is formed from a continuous piece of metal having through holes formed therein.

In some implementations, the first module is configured to attach to the second module with one or more corner fastening members, wherein each corner fastening member is formed from a continuous piece of metal having through holes formed therein.

In some implementations, the segment of the stairwell comprises an interior space configured to retain and support one or more stairwell components comprising: an interior stair landing; an exterior stair landing; an interior handrail; an exterior handrail; and at least two staircases, wherein a first staircase is joined with the interior landing, and a second staircase is joined with the exterior landing.

In some implementations, the exterior stair landing is configured to join and be supportive of a staircase from a second prefabricated stairwell and elevator shaft module.

In some implementations, the prefabricated stairwell and elevator shaft module further comprises four side wall panels fixedly attached to the exterior edges and configured to support the one or more stairwell components with fasteners.

In some implementations, the four side wall panels comprise one or more vertical studs arranged to receive the fasteners from the one or more stairwell components.

In some implementations, the prefabricated stairwell and elevator shaft module further comprises a base member arranged substantially parallel to the reference ground plane and formed of concrete, wherein the base member is arranged to support a bottom riser of a first step of the first staircase.

In some implementations, the exterior stair landing is fixedly attached to at least two longitudinal members and one transverse member with fasteners.

In another aspect, a multi-story building comprises: one or more levels formed from prefabricated interior and exterior panels and substantially parallel to a ground plane defined by a foundation; and a prefabricated stairwell and elevator shaft module configured to be adjacent at least one level of the one or more levels, the prefabricated stairwell and elevator shaft module comprising: four vertical members arranged orthogonal to the ground plane; four transverse members fixedly attached to upper and lower distal ends of the four vertical members with corner support members; four longitudinal members fixedly attached to upper and lower distal ends of the four vertical members with the corner support members; wherein the four vertical members, four transverse members, and four longitudinal members form side edges of the module and define an interior space configured to form a segment of one or more of an elevator shaft and a stairwell, the segment having a height corresponding to a single level of the one or more levels, the segment configured to communicate between levels of the multi-story building, and the segment being a self-supporting structure; wherein the corner support members each comprise at least one anchor hole configured to receive and engage with a lifting hook for lifting and placement of the prefabricated stairwell and elevator shaft module at a construction site for the multi-story building prior to installation of the prefabricated interior and exterior panels.

In some implementations, the segment of the elevator shaft comprises one or more engagement features configured to engage and retain elevator system components, and wherein the elevator system components comprise at least one elevator rail and at least one elevator counterweight.

In some implementations: the prefabricated stairwell and elevator shaft module is a first module, and the first module is configured to align and stack upon a second prefabricated stairwell and elevator shaft module; the first module is configured to attach to the second module with one or more transverse support members, wherein each transverse support member is formed from a continuous piece of metal having through holes formed therein; the first module is further configured to attach to the second module with one or more longitudinal support members, wherein each longitudinal support member is formed from a continuous piece of metal having through holes formed therein; and the first module is further configured to attach to the second module with one or more corner fastening members, wherein each corner fastening member is formed from a continuous piece of metal having through holes formed therein.

In some implementations, the multi-story building further comprises at least one prefabricated elevator pit directly beneath the prefabricated stairwell and elevator shaft module and attached thereto, wherein both of the prefabricated elevator pit and the prefabricated stairwell and elevator shaft module are prefabricated at a manufacturing facility separate from the construction site for the multi-story building.

In some implementations, the segment of the stairwell comprises an interior space configured to retain and support one or more stairwell components comprising: an interior stair landing; an exterior stair landing; an interior handrail; an exterior handrail; and at least two staircases, wherein a first staircase is joined with the interior landing, and a second staircase is joined with the exterior landing.

DETAILED DESCRIPTION

Figure 1:
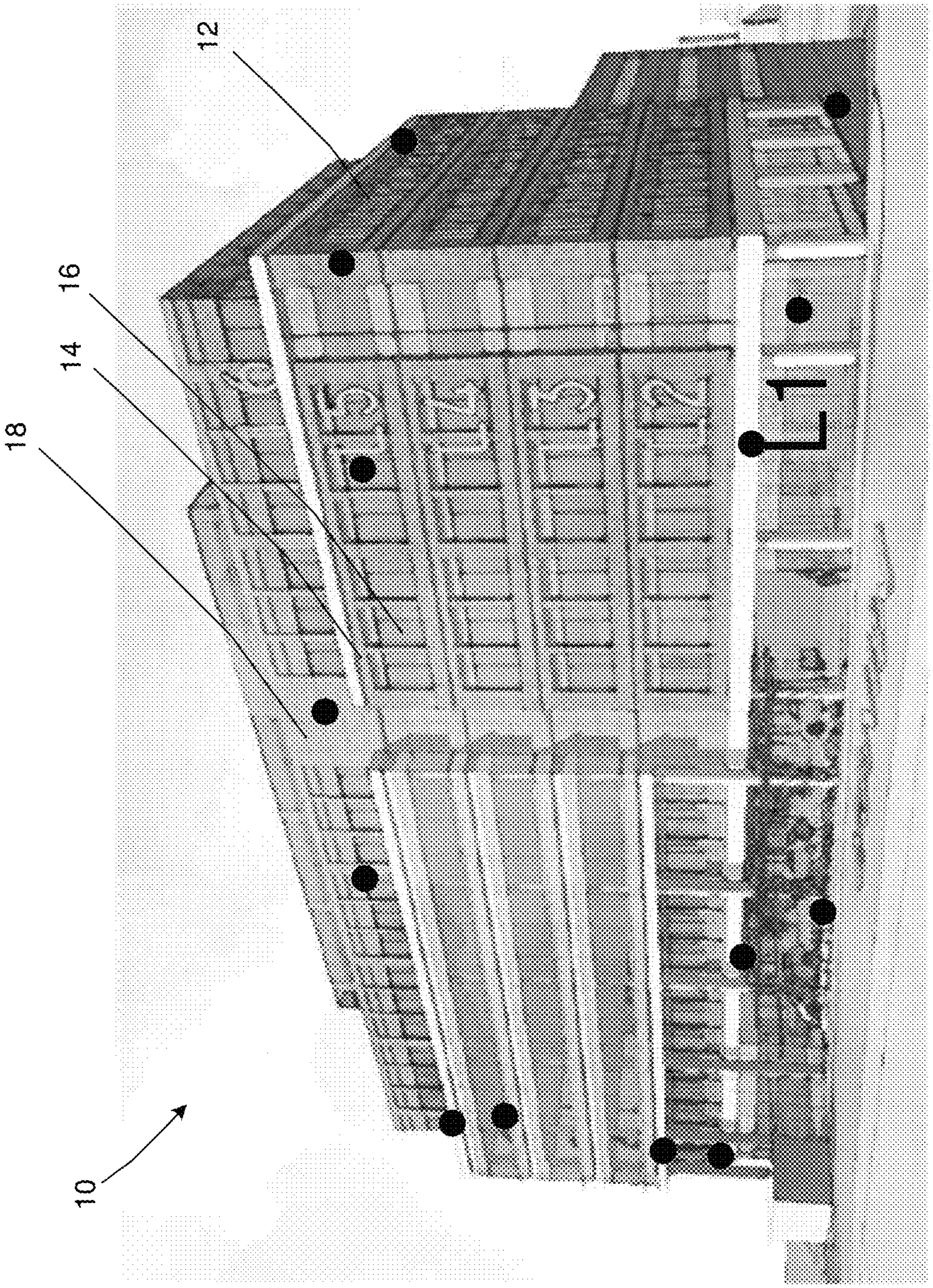
FIG. 1 is an illustration of an example multi-story building that can have load bearing walls and other building parts described herein, in accordance with some implementations.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are contemplated herein.

As used herein, the phrase "stair/elevator module" is interchangeable with "stair and elevator module," "stair or elevator module," "stair module," "elevator module," and any variants thereof. Furthermore, the term "prefabricated," when used to describe a stair/elevator module, denotes that individual modules are prefabricated in a manufacturing facility rather than a job-site.

As used herein, the term "longitudinal" refers to a relative direction, generally in the direction of a major length of a component; however, longitudinal may refer to any length if the component is square. As used herein, the term "transverse" refers to a relative direction that is substantially orthogonal to a longitudinal reference direction; however, lateral may refer to any direction that crosses a longitudinal direction in some examples where oblique members are arranged proximal longitudinal members. It should be readily understood that as both terms "longitudinal" and "lateral" are relative to a frame of reference, they may be used interchangeably depending upon a particular frame of reference, depending upon a desired final placement, and/or depending upon a specific context in which the two terms are used.

This disclosure is drawn, inter alia, to methods, systems, products, devices, and/or apparatuses generally related to prefabricated modules, load bearing walls, and other building parts (e.g., floor panels, stair and elevator modules, steel transfer structures, corridor panels, etc.) for a multi-story building, such as a low-rise or mid-rise building.

Traditionally, buildings are constructed using a metallic (e.g., steel, aluminum, etc.) structural frame that is designed to resist vertical and lateral loads. Thus, the structural frame can be thought of as a skeletal structure of a multi-story building, wherein the structural frame provides structural support for the building by absorbing vertical loads due to the weight of multiple stories and lateral loads such as due to wind or earthquakes, as well as providing the framing for various walls, floors, ceilings, and other components that can be affixed to the structural frame during the course of constructing the building. However, manufacturing and assembling such a traditional and extensive structural frame can be time consuming and costly in terms of labor and material. For instance, an affordable housing crisis or other community needs may dictate that buildings with good structural integrity be built quickly and economically.

Therefore, various embodiments disclosed herein provide structural components to construct a building, for example, load bearing walls and other building parts such that the reliance upon a traditional structural frame can be reduced or eliminated, while at the same time enabling the building to meet lateral and vertical loading requirements. The load bearing walls can be pre-manufactured demising walls, end walls, shear walls, or other vertical walls, at least some of which are constructed and arranged so as to provide the structural support for the building in a manner that is sufficient to enable the building to handle vertical and lateral loads. The other building parts, such as floor panels and corridor panels and their accompanying components, in combination with the load bearing walls and coupling linkages between them, also enhance the structural integrity for the building (e.g., for handling or transferring loads), improve acoustical performance, and increase fire safety.

The building may be a multi-story low-rise building or a multi-story mid-rise building in some embodiments. Each story of the building can include a single unit or multiple units. For instance, a particular unit may be living space, office space, retail space, storage space, or other human-occupied space or otherwise usable space in the building. In the context of living space, as an example, each story of the building may include multiple units to respectively accommodate multiple tenants.

The use of the pre-manufactured load bearing walls and other pre-manufactured parts enables the building to be constructed with a shorter time-to-build and at a lower cost (relative to a building that is constructed using a traditional structural frame), and without sacrificing the structural integrity of the building. Moreover, the floor-ceiling panels of the building may be made thinner relative to conventional floor-ceiling panels, thereby enabling the building to have more stories per vertical foot compared to a traditional building. Thus, the building is able to provide more usable space (e.g., living space) as opposed to a traditional building that occupies the same footprint. In other cases, the thinner floor-ceiling panels provide more space between the floor and ceiling of each unit, which may be desirable for some occupants that prefer living spaces with "high ceilings."

In some embodiments, the material composition of an entire module, as well as the wall, ceiling, and floor panels, may include steel. In some embodiments, the material composition may include aluminum. In still other embodiments, the wall, ceiling, and floor panels may be made from a variety of building suitable materials ranging from metals and/or metal alloys, composite materials, glass mat, gypsum, fiber cement, magnesium oxide, to wood and wood polymer composites (WPC), wood based products (lignin), other organic building materials (bamboo) to organic polymers (plastics), to hybrid materials, earthen materials such as ceramics, or any other suitable materials or combinations thereof. In some embodiments, cement, grout, or other pourable or moldable building materials may also be used. In other embodiments, any combination of suitable building material may be combined by using one building material for some elements of the entire module, as well as the wall, ceiling and floor panels, and other building materials for other elements of the entire module, as well as the wall, ceiling, and floor panels. Selection of any material may be made from a reference of material options (such as those provided for in the International Building Code), or selected based on the knowledge of those of ordinary skill in the art when determining load bearing requirements for the structures to be built. Larger and/or taller structures may have greater physical strength requirements than smaller and/or shorter buildings. Adjustments in building materials to accommodate size of structure, load, and environmental stresses can determine optimal economical choices of building materials used for components in an entire module, as well as the wall, ceiling, and floor panels described herein. Availability of various building materials in different parts of the world may also affect selection of materials for building the system described herein. Adoption of the International Building Code or similar code may also affect choice of materials.

Any reference herein to "metal" includes any construction grade metals or metal alloys as may be suitable for fabrication and/or construction of the entire module, as well as wall, ceiling, and floor panels, and/or other components thereof described herein. Any reference to "wood" includes wood, wood laminated products, wood pressed products, wood polymer composites (WPCs), bamboo or bamboo related products, lignin products and any plant derived product, whether chemically treated, refined, processed or simply harvested from a plant. Any reference herein to "concrete" or "grout" includes any construction grade curable composite that includes cement, water, and a granular aggregate. Granular aggregates may include sand, gravel, polymers, ash and/or other minerals.

FIG. 1 is an illustration of an example multi-story building 10 that can have a podium level steel transfer structure, load bearing walls, and other building parts (e.g., pre-manufactured floor-ceiling panels, corridor panels, utility walls, window walls, and other type of walls, etc.), in accordance with some implementations. It is noted that the building 10 of FIG. 1 is being shown and described herein as an example for purposes of providing context for the various embodiments in this disclosure. The various embodiments may be provided for buildings that have a different number of stories, footprint, size, shape, configuration, appearance, etc. than those shown for the building 10.

The building 10 may be a multi-story building with one or more units (e.g., living, office, or other spaces) in each story. In the example of FIG. 1, the building 10 has six stories/levels, labeled as levels L1-L6. Also as shown in FIG. 1, the building 10 has a generally rectangular footprint, although the various embodiments disclosed herein may be provided for buildings having footprints of some other shape/configuration. Moreover, each story may not necessarily have the same shape/configuration as the other stories. For instance in FIG. 1, level L6 of the building 10 has a smaller rectangular footprint relative to levels L1-L5.

The ground floor level L1 may contain living spaces, office spaces, retail spaces, storage spaces parking, storage, common areas (such as a lobby), etc. or combination thereof. Levels L2-L6 may also contain living spaces, office spaces, retail spaces, storage spaces, common areas, etc. or combination thereof. Such spaces may be defined by discrete units, separated from each other and from corridors or common areas by interior demising walls and utility walls (not shown in FIG. 1). An individual unit in turn may be made up of multiple rooms that may be defined by load bearing or non-load bearing walls. For example, a single unit on any given level may be occupied by a tenant, and may include a kitchen, living room, bathrooms, bedrooms, etc. separated by walls, such as demising walls or utility walls. There may be multiple units (e.g., for multiple respective tenants) on each story, or only a single unit (e.g., for a single tenant) on a single story.

Each end of the building 10 includes an end wall 12. One or more panels that make up the end wall 12 may span a single story in height, or may span multiple stories (e.g., two or more stories) in height. Any of the sides of the building 10 may include a window wall 14 that accommodates a window 16, such as window(s) for unit(s). One or more panels that make up the window wall 14 may span a single story in height. Some parts of the building 10 may include an end wall without windows (e.g., not a window wall), such as an end wall 18, which may be comprised of a panel that spans one story of the building 10.

The unit(s) in each story may be formed using either an entire pre-manufactured module or from one or more pre-manufactured floor-ceiling panels and wall panels (not shown in FIG. 1), and the units may also adjoin each other via hallways having pre-manufactured corridor panels as floor panels. A floor-ceiling panel may form the floor of a first unit and a ceiling of a second unit below the first unit, and may also be used to form part of the roof of the building 10 when used as the ceiling panel for the top floor. The pre-manufactured wall panels may be used to form interior walls (e.g., demising walls, utility walls that serve as corridor walls, etc.), window walls (e.g., exterior window wall 14 that accommodate one or more windows 16), utility walls (e.g., walls with utilities such as plumbing and electrical wiring contained therein), end walls, etc. According to various embodiments, at least some of these panels may be pre-manufactured off-site, and then installed on site by coupling them together to construct the building 10. The various components of such panels and how such panels are attached to each other will be described later below.

The sides of interior walls that face the interior space (e.g., living space) of the building 10 may be covered by a finish panel, such as wall paneling, for decorative and/or functional purposes. Analogously, the sides of floor-ceiling panels that face the interior space (e.g., living space) of the building 10 may also be covered with laminate flooring, finish panels, tile, painted/textured sheetrock, etc. for decorative and/or functional purposes. For exterior walls such as end walls and window walls, the sides of these walls facing the outside environment may be covered with waterproofing membranes, tiles, glass, or other material for decorative and/or functional purposes.

According to various implementations, the building 10 is constructed using load bearing walls (such as demising walls, end walls, etc.). In this manner, such walls are able to support vertical loads, as well as lateral loads. Because these walls are load bearing components, the building 10 can eliminate or reduce the use of an extensive steel structural frame in at least some of the levels. For instance, a steel structural frame (e.g., made of an array of beams and columns to which each and every floor-ceiling panel and wall are directly attached) may be absent in levels L2-L6. A steel structural frame may be used in level L1 and/or further structural reinforcement may be given to load bearing walls that are used in level L1 alternatively or in addition to a structural frame, so as to provide structural integrity at ground level.

The building 10, having six levels L1-L6, is defined in some jurisdictions as a mid-rise building (e.g., buildings having five to 12 levels). Buildings having four levels and under are defined in some jurisdictions as a low-rise building. The various embodiments of the load bearing walls described herein may be used in low-rise and mid-rise buildings. Such low-rise and mid-rise buildings may have various fire ratings, with a 2-hour fire rating for mid-rise buildings of six stories or more and a 1-hour fire rating for buildings of five stories or less being examples for some of the buildings that use the load bearing walls described herein.

In some embodiments, the load bearing walls and other building parts described herein (in the absence of a structural frame, or with a reduced amount thereof) may be used for buildings that have a greater number of stories than a typical low-rise or mid-rise building. In such embodiments, the load bearing walls and/or other building parts described herein may be implemented with additional and/or modified structural components, so as to account for the increased load associated with the greater number of stories.

For purposes of example and illustration, some buildings described herein will have a generally rectangular footprint, and will be assumed to be a low-rise building having at most five stories (levels), and it is understood that the various implementations described herein may be used for buildings with other numbers of stories. The features disclosed herein may be adapted to construct buildings having other shapes, sizes, heights, configurations, number of stories, etc., or any other building where load bearing walls and the other building parts described herein are used in the absence of extensive structural frames on at least some stories. In some embodiments, the various operations of a construction sequence may be performed in a different order, omitted, supplemented with other operations, modified, combined, performed in parallel, etc., relative to what is shown and described herein.

Generally, construction of mid-rise buildings may include a podium level foundation created on-site, through skilled labor including welding, riveting, and other joining, as well as through complex construction and surveying techniques, including complex structural framing built on-site prior to traditionally constructing units into this traditional structural framing.

In some embodiments, the load bearing walls and other building parts described herein (in the absence of a structural frame, or with a reduced amount thereof) may be used for buildings that have a greater number of stories than a typical low-rise or mid-rise building. In such embodiments, the load bearing walls and/or other building parts described herein may be implemented with additional and/or modified structural components, so as to account for the increased load associated with the greater number of stories.

As described herein, aspects of prefabricated stair/elevator modules are presented with reference to the many drawings, where portions of the prefabricated stair/elevator modules are illustrated in relation to other building components. The prefabricated stair/elevator modules are configured to receive and transfer a portion of loads from the super structure of a building and transfer the same amongst various members to a podium level steel transfer structure. The podium level steel transfer structure comprises a steel frame that receives and transfers these loads to the foundation, such as a steel reinforced concrete foundation, or other appropriate foundation. The steel transfer structure may have columns (e.g., vertical members) having a height that spans at least one story, girders (e.g., longitudinal members) that join pairs of columns, and beams (e.g., transverse members) that perpendicularly join pairs of girders. The steel transfer structure may further include brace frame members that join to the prefabricated stair/elevator modules. The brace frame members, in combination with the prefabricated stair/elevator modules, allow for novel and rapid construction techniques that offer significant technical effects and benefits as compared to traditional frame construction.

For example, and without limitation, the prefabricated stair/elevator modules allow for installation of entire portions of elevator shafts and stairwells, without onsite skilled labor. The pre-constructed modules can be installed at ground/foundation level, and are laid upon one another, joined using lateral braces and corner brackets, and are self-supporting structures. These partially fabricated self-supporting structures allow use (e.g., traveling up/down stairs and/or use of a modular elevator) during construction, thereby further increasing the speed and agility in constructing a building. Moreover, as each prefabricated stair/elevator module contains fully installed components, there are some advantages provided by using the modules to aid in the erection of the building as compared to using scaffolding and temporary structures to aid in building construction. Hereinafter, with reference to FIGS. 2-20, prefabricated stair/elevator modules used in buildings (such as building 10) are described in detail.

Figure 2A:
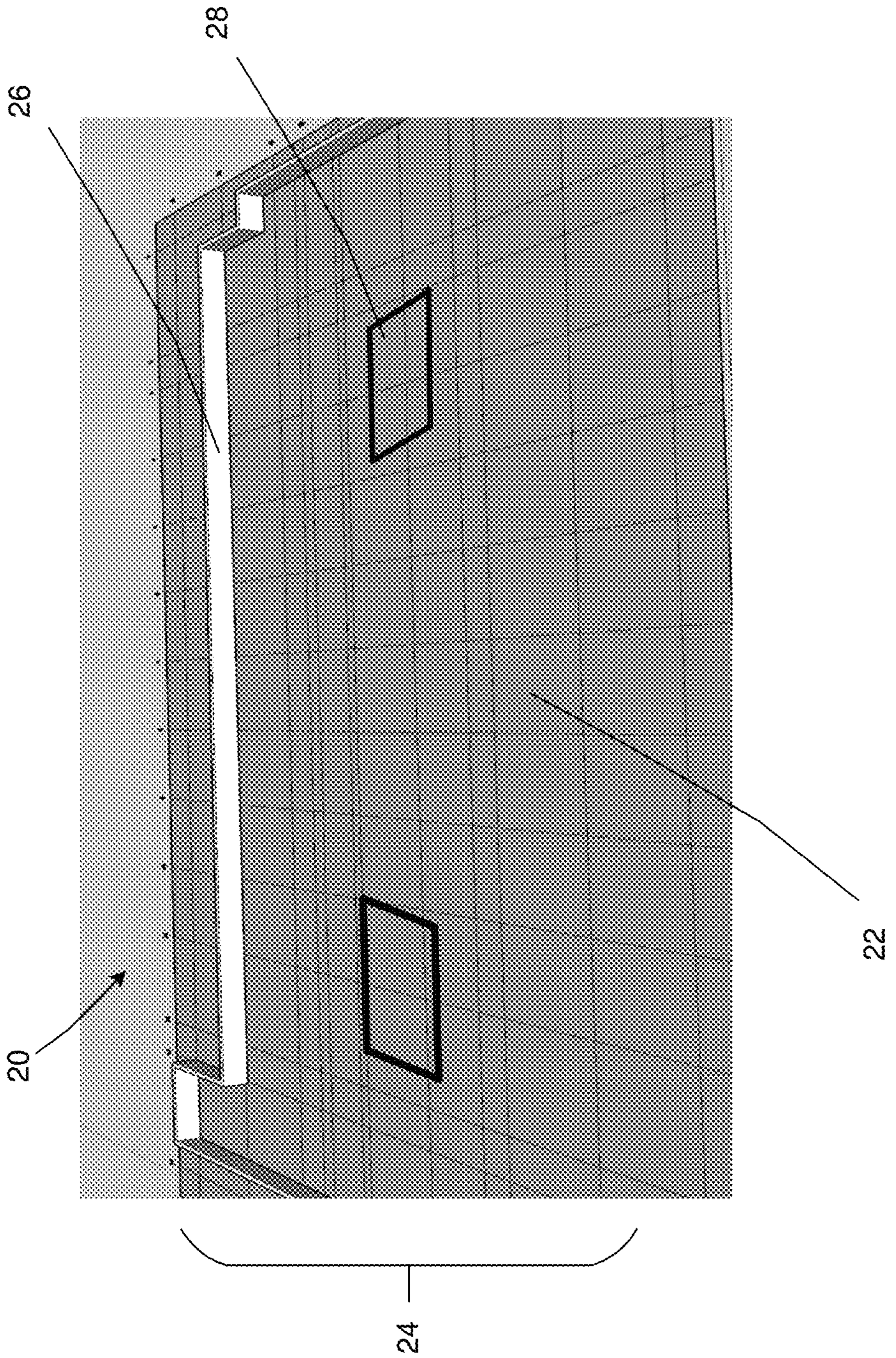
FIGS. 2A, 2B, and 2C illustrate an example building foundation with prefabricated stair/elevator modules, in accordance with some implementations.

In FIG. 2A, a foundation 22 is first formed. The foundation 22 may be a steel reinforced concrete slab that is poured on the ground to define a footprint 24 of a building 20, or may be some other type of shallow or deep foundation structure. Such a foundation structure may include, for example, foundation walls 26. Furthermore, excavation of the ground may also be performed to form a basement and/or elevator pit(s) 28 that form part of one or more elevator shafts to accommodate one or more elevators.

Figure 2B:
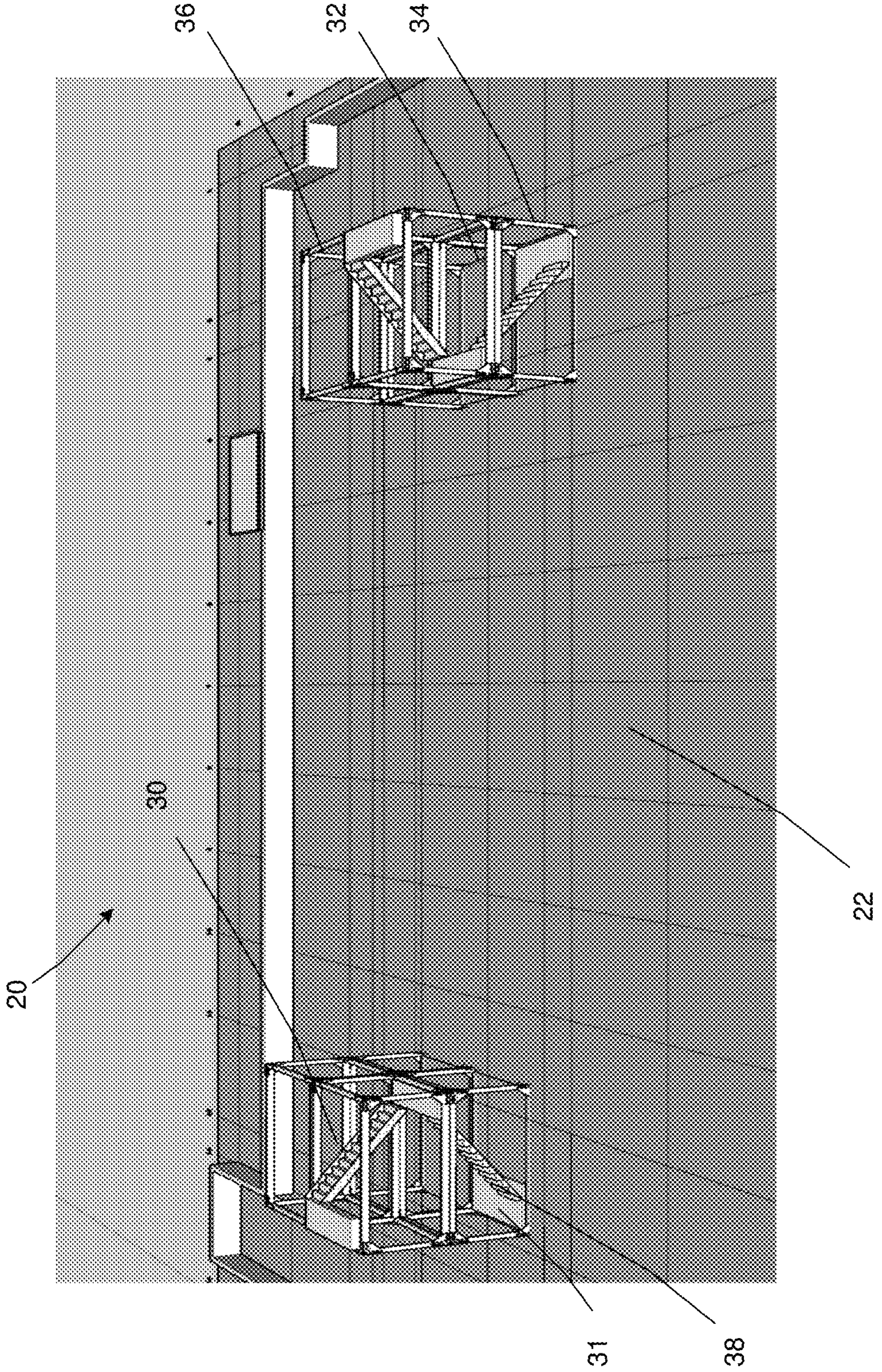

In FIG. 2B, prefabricated stair and elevator modules 30 and 32 may be assembled or joined onto the foundation 22, and positioned such that the elevator portions of the modules 30 and 32 that will contain the elevator shaft are superimposed over the elevator pit(s) 28. Furthermore, as will be described herein in reference to FIGS. 4-5, prefabricated elevator pits form a portion of the installed modules 30 and 32. The prefabricated elevator pits are dimensioned to support elevator components below-ground level, and are structured as concrete forms for pouring of concrete about an exterior periphery of the elevator pits to form the basis of support for modules 30 and 32. The modules 30 and 32 according to various embodiments may be two stories in height, and there may be one or more of these modules per building, with two modules 30 and 32 shown by way of example in FIG. 2B.

Each of the modules 30 and 32 may be comprised of vertical columns 34 made of steel, and horizontal beams 36 spanning between the columns and also made of steel. Thus, the columns 34 and the beams 36 form a structural frame, braced at respective corners (see FIGS. 11-12). Each of the modules 30 and 32 may alternatively be formed of horizontal ring beam structures and load bearing wall panels arranged there—about (see FIGS. 21-22).

As depicted in the example of FIG. 2B, each level of a module, such as the module 30, includes a staircase 38 and a landing 31 for its stair portion, and as previously explained above, further includes an adjoining elevator portion (that is superimposed over the previously constructed elevator pit and/or modular elevator pit form) that will be occupied by an elevator shaft.

The modules 30 and 32 of various embodiments are positioned at specific locations of the foundation 22. In the example of FIG. 2B, the modules 30 and 32 are positioned on opposite sides of the building 20. Other configurations may be used, such as positioning one or more modules at a central location in the building footprint or at any other suitable location(s) on the building footprint such that the modules may provide stabilization points.

Figure 2C:
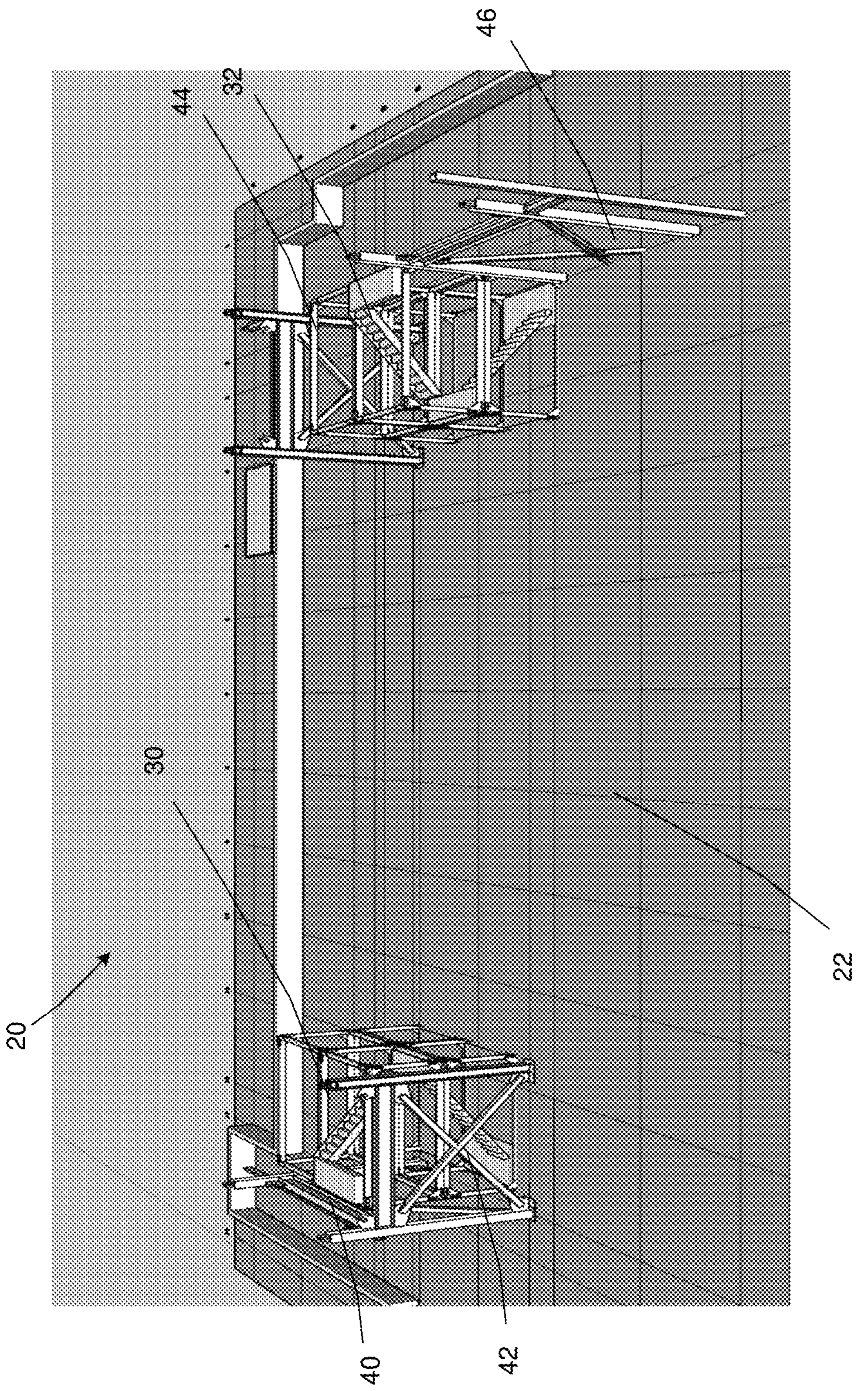

In FIG. 2C, brace frames are installed on the foundation 22 in relation to the modules 30 and 32. For example, brace frames 40 and 42 are arranged perpendicularly around and in close proximity to the module 30, such that the module 30 is nested by the brace frames 40 and 42. With respect to the module 32, brace frames 44 and 46 are also arranged perpendicularly relative to the module 32 but spaced away from the module 32 by a greater distance.

The brace frames 40-46 may be arranged on the foundation 22 in any suitable location and orientation, dependent on factors such as the footprint or configuration of the building 20, source of lateral and/or vertical loads, location/orientation for optimal stabilization, etc. Any suitable number of brace frames may be provided at the ground level. The brace frames may further vary in configuration. The example of FIG. 2C depicts brace frames that are generally planar in shape (made of two columns and at least one horizontal beam that joins the two columns), with cross beams (X shaped beams) at the center of the brace frames. The brace frames 40-46 may span one, two, or other stories in height or intermediate heights.

The brace frames 40-46 may be repeatedly installed at each level (or every other level) as the building 20 is erected. Furthermore, bracing members may be used to link the brace frames 40-46 to other portions of the building 20, including to floor-ceiling panels, corridor floor panels, podium level steel transfer structures, and the like. A variety of bracing members may be used. For example, a bracing member may be a generally horizontal member formed of hollow structural steel (HSS) with one or more end plates welded thereon, and configured to be fixedly attached at a first distal end to brace frames 40-46 and fixedly attached at a second distal end to one or more of floor-ceiling panels, corridor floor panels, podium level steel transfer structure, or other building components.

According to various embodiments, the modules 30 and 32 are used as erection aids that guide the positioning and orientation of the brace frames 40-46. For instance, the modules 30 and 32 are installed first, and then the brace frames 40-46 are arranged relative to the location of the modules 30 and 32. The brace frames may be directly welded (or otherwise attached/connected) to the modules, or may be linked to the module(s) over a distance via linking beams or other structural framing. In this manner, the modules 30 and 32 stabilize the brace frames 40-46, and the brace frames 40-46 can operate to also absorb vertical and lateral loads from the building 20 and/or transfer such load(s) to the modules 30 and 32 via their linking connections, and to a podium level steel transfer structure whereby loads are finally dispersed in the foundation 22.

As modules 30 and 32 are assembled and joined to one another, a vertical assembly 100 is formed having an overall height based on the sum of individual heights of modules that are stacked upon one another. Generally, individual heights of the prefabricated modules 30 and 32 may differ based on end characteristics of the building 20. However, different height modules may generally be aligned to suitable levels of the building 20. For example, while a particular module may not extend a full height of the first level L1 of building 20, a suitable module may be used to "make up" the height different, after which modules with the height of levels L2-L6 may be stacked upon one another.

Figure 3:
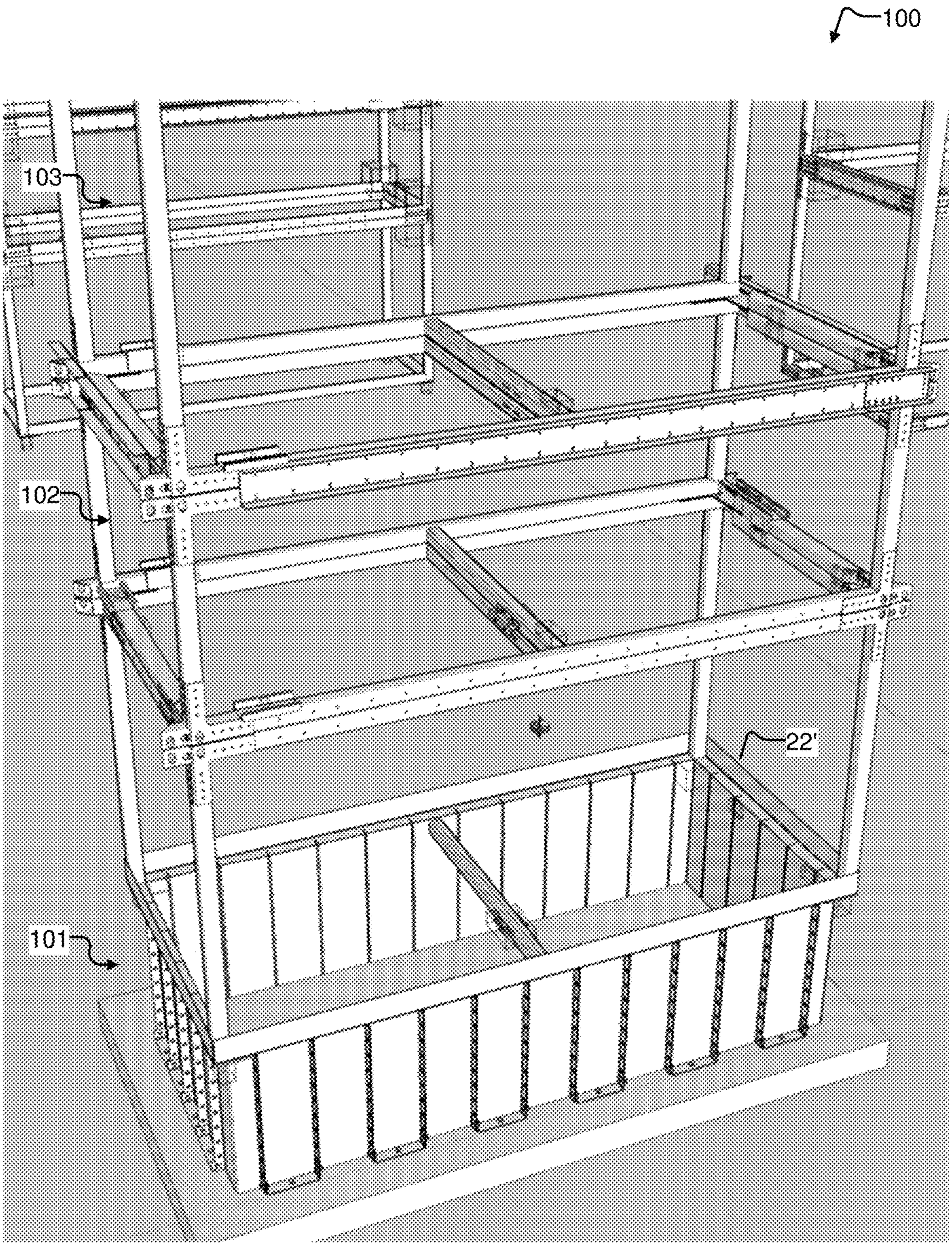
FIG. 3 is an axonometric view of an assembly of prefabricated stair/elevator modules, in accordance with some implementations.

FIG. 3 is an axonometric view of an assembly 100 of prefabricated stair/elevator modules, in accordance with some implementations. As shown, an elevator pit module 101 is installed within foundation 22, with an upper lip of the pit module at or about approximate ground level 22'. In this manner, concrete may be poured about the pit module 101 such that an integral elevator pit is formed with reduced labor.

Two differing height modules 102 and 103 may be stacked upon the pit module 101, such that an initial height of the elevator module may be sufficient to service level L1 of the building 20. For example, and without limitation, in some instances each module 102 and 103 may be the same or similar heights. In these examples, the standard height of each module may provide reference and support for associated levels L2-L6 of the building 20. In other examples, different heights may be mixed so as to allow for building differences based on foundation, job-sites, and other considerations. However, in general, upon forming the base of an elevator shaft using module 101 and one or more modules 102-103, a standard height module having a height of about one story of the building 20 may be used to simplify construction.

Figure 4:
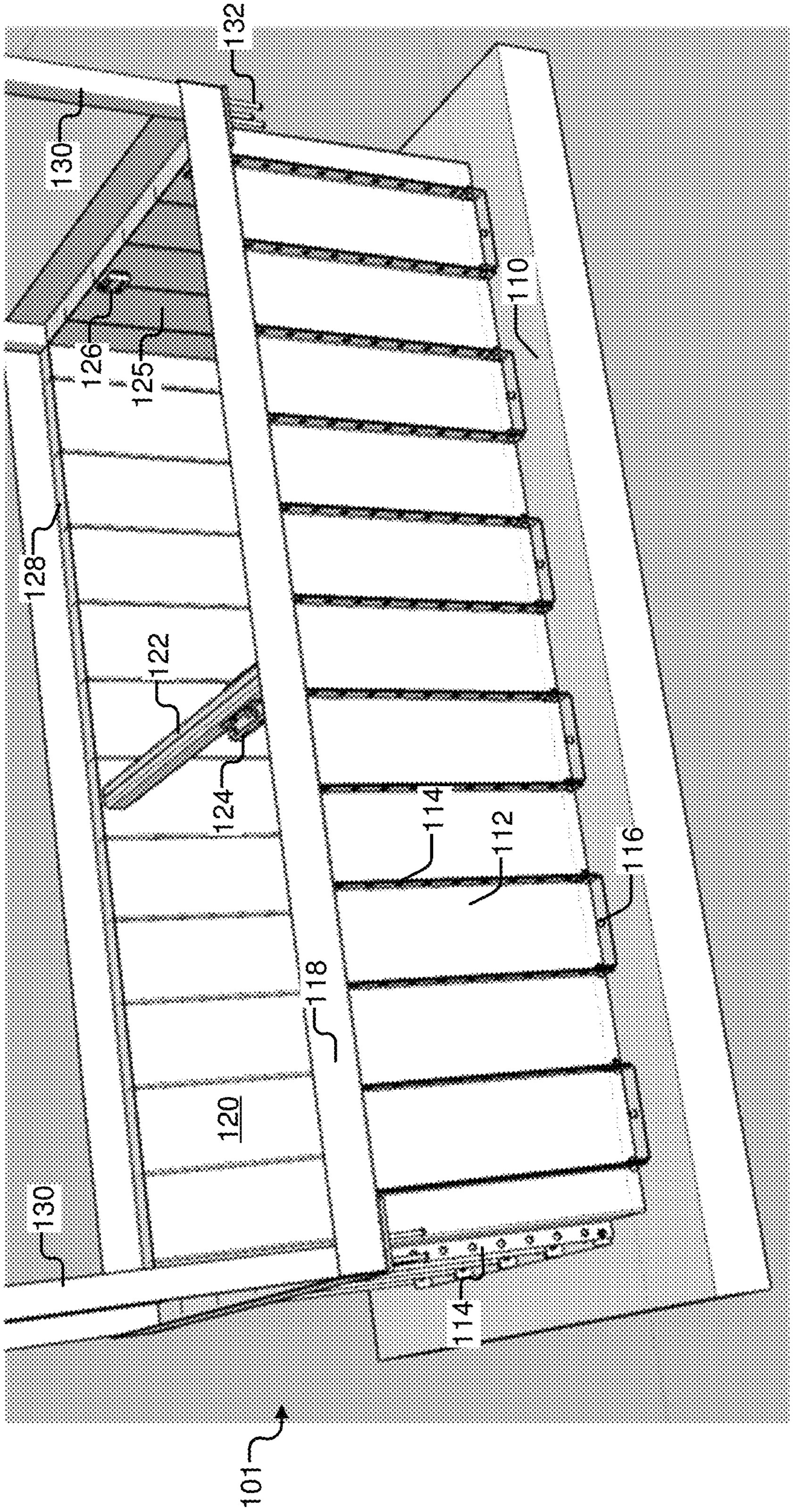
FIG. 4 is an axonometric view of a prefabricated elevator pit, in accordance with some implementations.

FIG. 4 is an axonometric view of a prefabricated elevator pit 101, in accordance with some implementations. The elevator pit 101 may include a base member 110 of a substantially rectangular profile. The base member 110 may be formed of concrete in some implementations. In other implementations, the base member 110 may be formed of another suitable material, including natural stone or other heavy materials or a combination thereof. The base member 110 may be waterproofed through application of an appropriate sealant, in some implementations.

Extending upwards/vertically from the base member 110 are folded members 112. Each folded member 112, when assembled about the base member 110, form individual panels having seams 114 fixedly attached to proximal members 112 through fasteners or welding. The base of each folded member 112 may be attached to the base member 110 through fasteners 116. Each seam 114 and folded member 112 may therefore form a concrete mold for pouring of concrete about the pit module 101. In some implementations, the folded members 112 are formed of steel, aluminum, or another foldable material. Furthermore, seams 114 provide structural rigidity based on construction from metal, such that the entire concrete mold formed by the pit module 101 may withstand installation without failure or significant damage, thereby simplifying construction of the building 20.

The vertical folded members 112 terminate at a peripheral lip portion 128 that may be formed of angle material 118, such as angled steel members welded thereto. The peripheral lip portion 128 and angle material 118 may support vertical members 130 extending upwards orthogonally to the base member 110. The vertical members 130 may be formed of HSS or another suitable material. The vertical members 130 may be attached to the peripheral lip portion 128 and angle material 118 through fasteners 132.

As noted above, the folded members 112 are joined to the base member 110. The joined members 112 and base member 110 form a concrete mold having an interior space 120 defined therein. The interior space 120 should not be filled with concrete, but rather, is used as an elevator pit to house associated elevator components. For example, the interior space 120 may be used as a conventional elevator pit configured to receive a counterweight(s), pulleys, compensation ropes, anchors, elevator rails, tensioning components, tensioning sleeves, counterweight buffers, elevator car/trolley buffers, and/or other suitable components.

Extending transverse across the opening 120 is a central support member 122. The central support member 112 may include one or more engagement features 124 disposed thereon and configured to receive and retain elevator components, such as, for example, elevator rails, counterweight components, and other components. Furthermore, each side wall 125 of the interior space 120 may include one or more engagement features 126 disposed thereon and configured to receive and retain elevator components, such as, for example, elevator rails, counterweight components, and other components.

Figure 5:
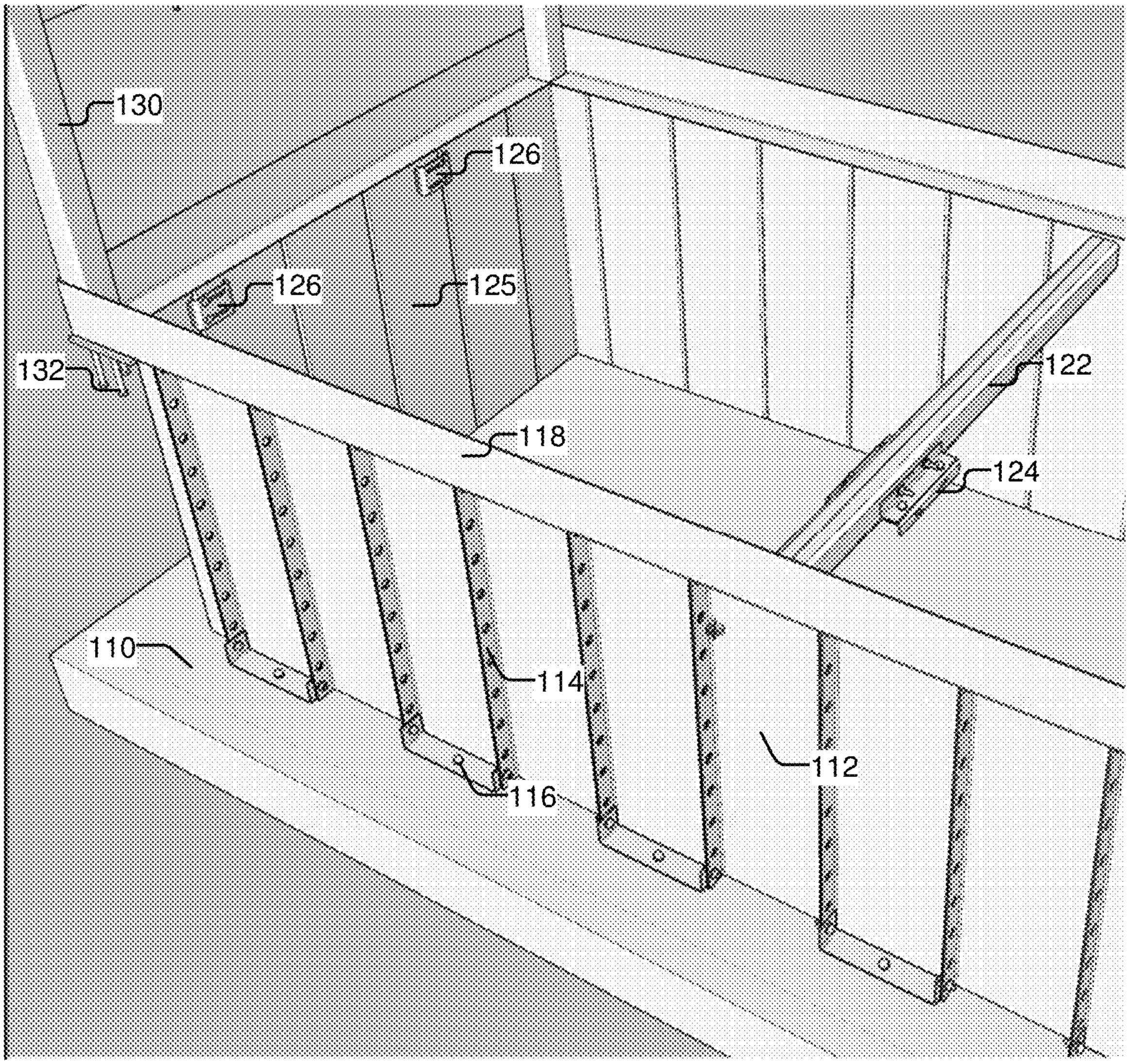
FIG. 5 is an additional view of a prefabricated elevator pit, in accordance with some implementations.

FIG. 5 is an additional view of a prefabricated elevator pit 101, in accordance with some implementations. As illustrated, the elevator pit module 101 comprises folded members 112 that define an interior space, and provide structural rigidity to the pit. Furthermore, vertical members 130 are mounted orthogonal to the base member 110 using fasteners 132.

Figure 6:
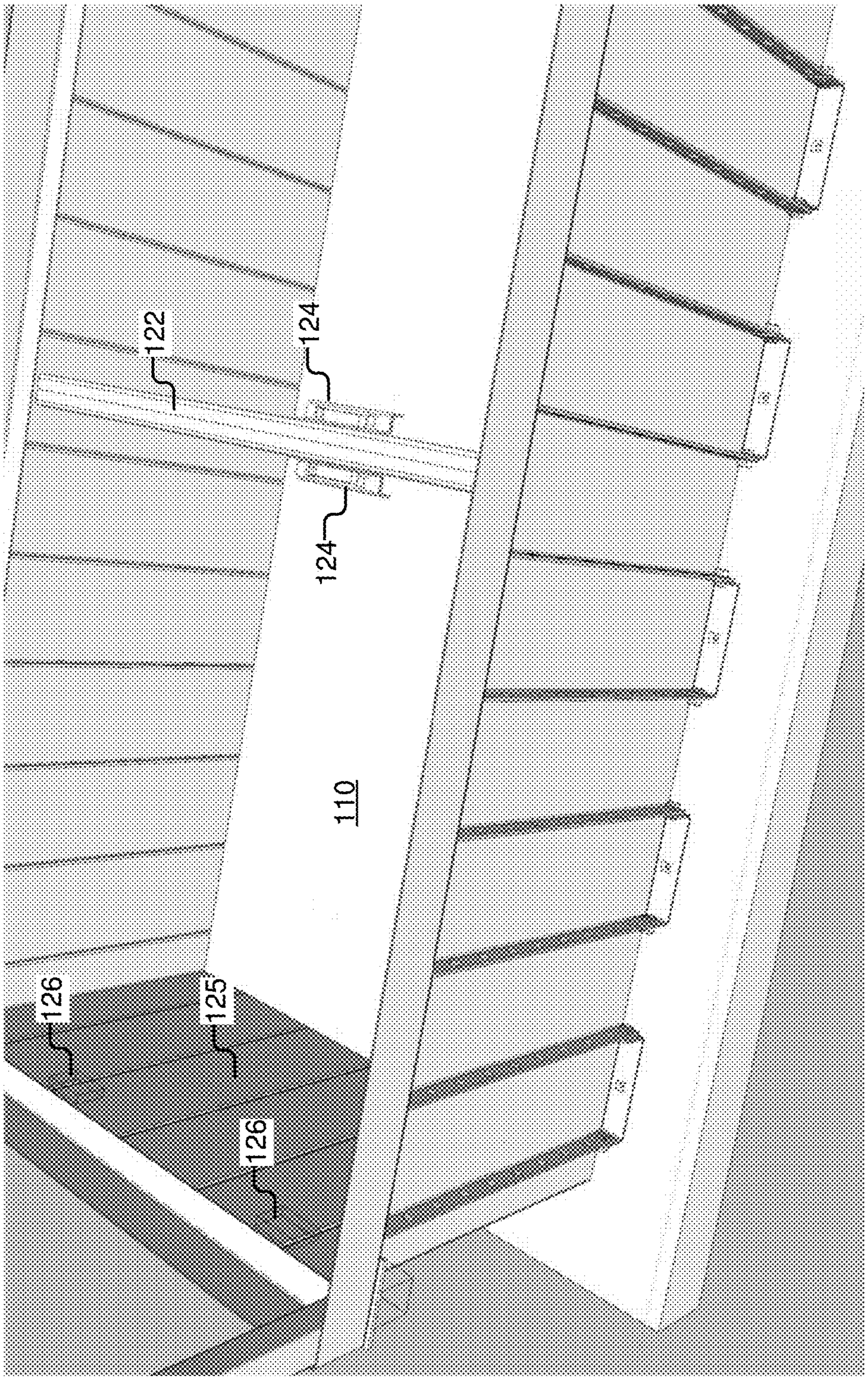
FIG. 6 is detail view of a prefabricated elevator pit, in accordance with some implementations.

FIG. 6 is detail view of a prefabricated elevator pit 101, in accordance with some implementations. As illustrated, the central support member 122 includes engagement features 124 disposed on either interior edge for supporting and engaging with elevator componentry. Furthermore, any number of engagement features 124 and 126 may be mounted onto support member 112 and walls 125, respectively. The engagement features 124 and 126 may include keyhole slots, tapered slots, and/or other features depending upon requirements of the particular elevator components. Therefore, while a keyhole slot is illustrated for the purposes of discussion, it should be readily understood that any suitable engagement feature may be applicable depending upon any desired elevator components to be installed.

Figure 7:
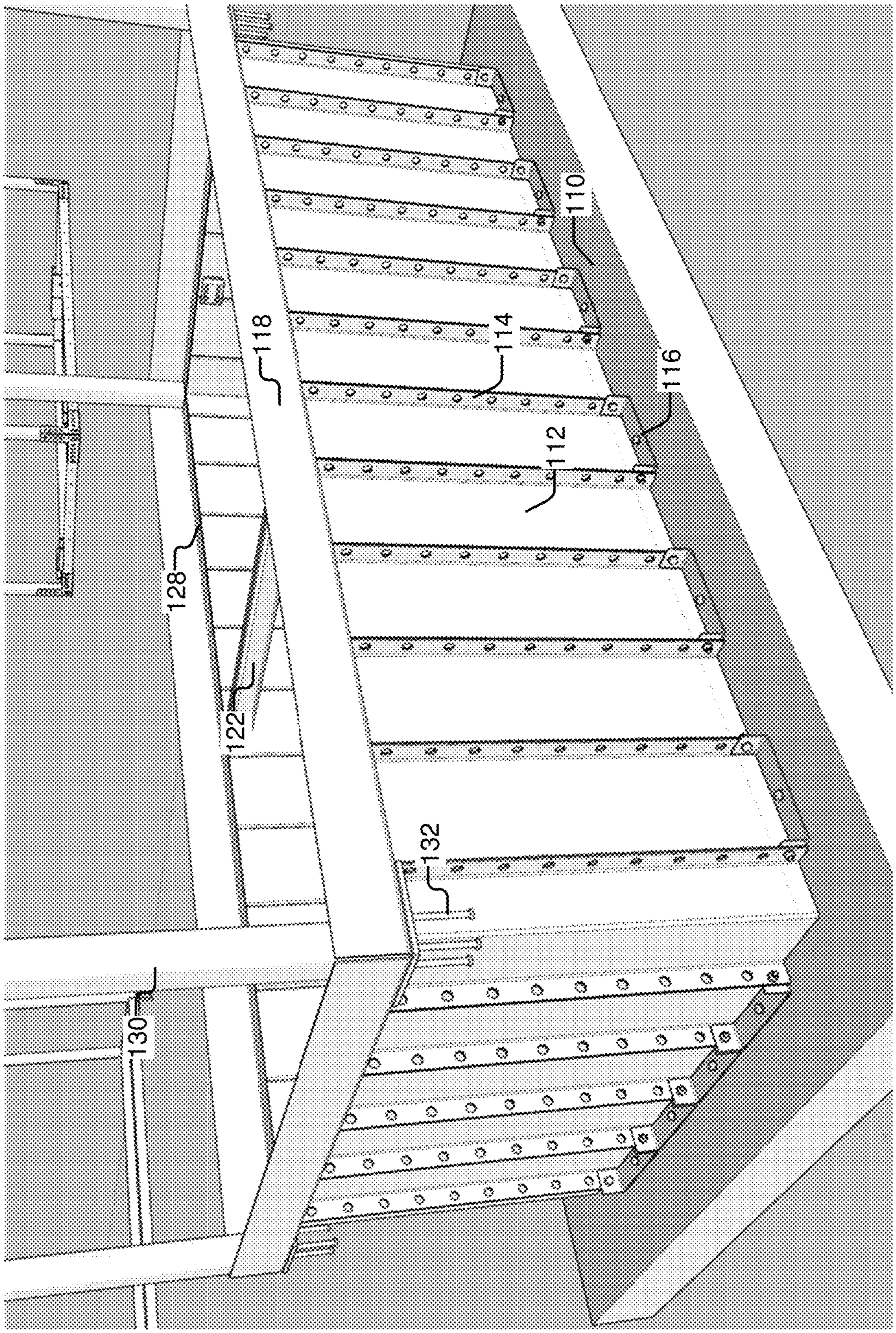
FIG. 7 is an alternate detail view of a prefabricated elevator pit, in accordance with some implementations.

FIG. 7 is an alternate detail view of a prefabricated elevator pit 101, in accordance with some implementations. As shown, fasteners 116 allow the pit module 101 to be lowered into an appropriate hole or pit dug into a job-site. Thereafter, the lowered module 101 forms a concrete mold with folded members 112 and associated seams 114 providing structural rigidity until the concrete cures. Furthermore, as seams 114 protrude into the concrete once poured, the seams 14 provide reinforcement to the concrete, thereby bolstering the utility of the installed pit module 101 as a dual-use module, being both a suitable concrete mold and a suitable elevator pit. These increases in construction efficiency translate to lower costs in preparing a foundation for the building 20.

As noted above, the pit module 101 may be lowered into a dug hole, and concrete poured to form an integral portion of the foundation 22 as well as a functioning elevator pit. Thereafter, stair/elevator modules may be stacked onto the vertical members 130, and fixedly attached thereto, to form an assembly such as assembly 100.

Figure 8:
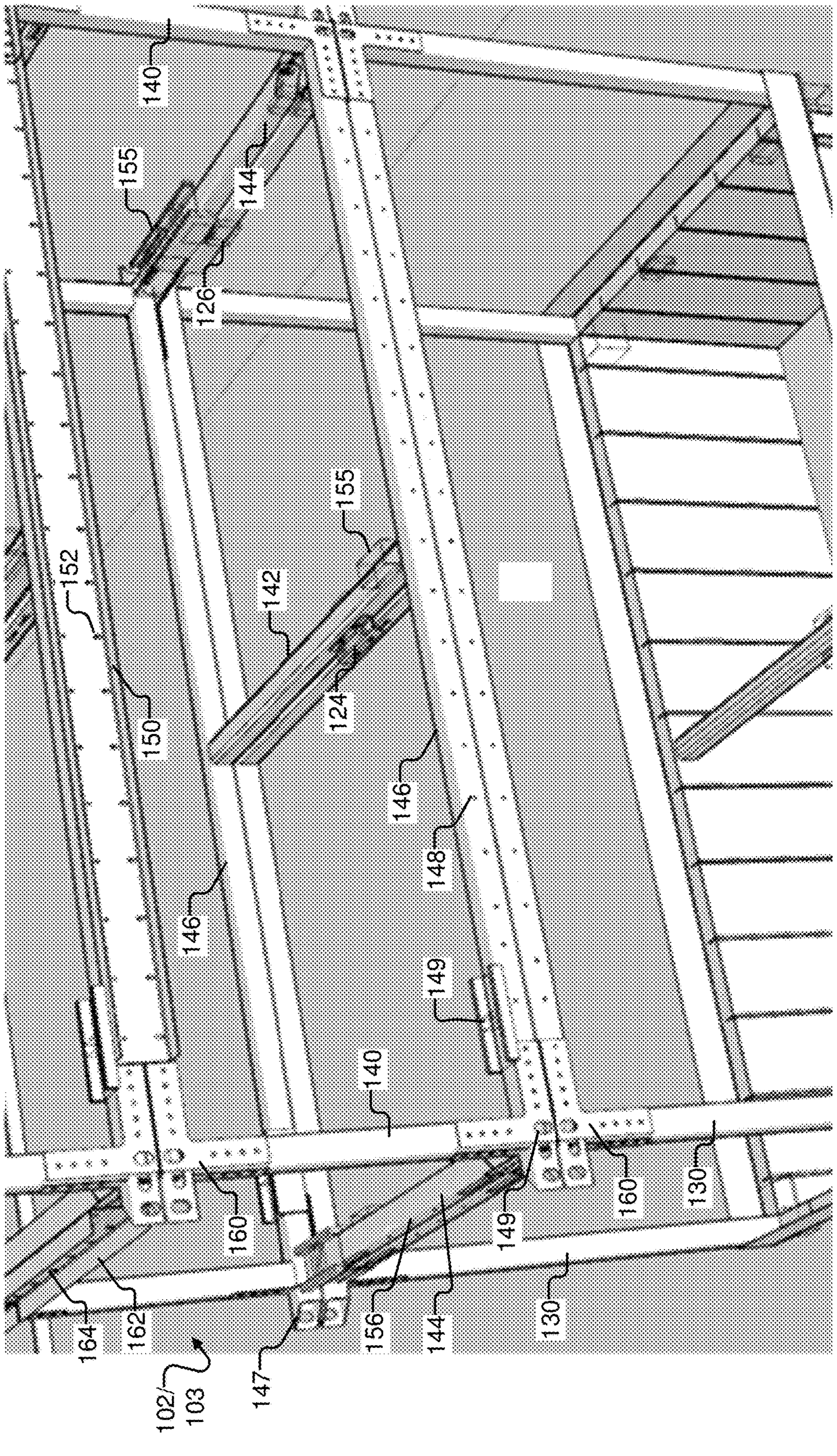
FIG. 8 is an axonometric view of prefabricated stair/elevator modules mounted onto a prefabricated elevator pit, in accordance with some implementations.

FIG. 8 is an axonometric view of prefabricated stair/elevator module 102 mounted onto a prefabricated elevator pit 101, in accordance with some implementations. As shown, the stair/elevator module 102 is substantially similar to stair/elevator module 103 presented above, despite differences in final height. Accordingly, superfluous description of both of the stair/elevator modules 102 and 103 are omitted herein for the sake of brevity.

The stair/elevator module 102 is a functional open-top, open-bottom box that forms a portion of either a stairwell or an elevator shaft. Each stair/elevator module 102 may be stacked onto one another to form new serviceable levels of the stairwell or elevator shaft. Furthermore, each stair/elevator module 102 may be fixedly attached to one another via fasteners, such as bolts, at a job site, such that relatively minimal/reduced skilled labor is required to form a functioning and safe stairwell and/or elevator shaft. Generally, near ground level the elevator pit form creates a closure for the elevator core and upper modules provides a roof cap and mounting points for elevator machine and lifting beam(s). Additionally, the stair variations of these modules similarly has a top out section that caps and encloses the top of the stairwell.

The stair/elevator module 102 comprises four longitudinal members 146 and four transverse members 144 arranged as edges of the module. Each member 144 and 146 may be formed from HSS or another suitable material. Each member 144 and 146 may be dimensioned to create a cross-sectional "ring" that may be joined to other structural members of the building 20 through, for example, horizontal bracing members.

The transverse members 144 may be generally rectangular, with flat distal ends joined to associated longitudinal members via corner support members 160. The longitudinal members 146 may be generally rectangular members having oblique distal ends 147 configured to allow a space for elevator counterweights between adjacent modules 102/103. The space or void formed through the oblique ends 147 may be dimensioned according to elevator component requirements. Furthermore, if used as a stairwell, the oblique ends 147 may be omitted. Furthermore, as will become apparent, the oblique ends 147 and corner support members 160 include through holes 149 that are dimensioned to accommodate engagement with hooks or temporary attachments for lifting and placement of the entire module 102/103 during building construction. These holes 149 may engage a hook, forklift prong, or other lifting component to facilitate relatively easy placement at a job-site.

Each transverse member 144 may include associated engagement features 126 and 155 disposed and attached thereto, and configured to receive, engage, and retain elevator components. The particular features of each engagement feature 126 and 155 may be altered from those forms illustrated based upon a particular elevator system being installed into the building 20. Furthermore, each transverse member 144 includes several captive fasteners 156 and/or holes configured to receive fasteners, for joining of two modules together.

Each longitudinal member 146 includes several captive fasteners 148 and/or holes configured to receive fasteners, for joining of two modules together. Furthermore, each longitudinal member 146 may include engagement features 149 disposed and attached thereto, and configured to receive, engage, and retain elevator components. The particular features of each engagement feature 149 may be altered from those forms illustrated based upon a particular elevator system being installed into the building 20.

The stair/elevator module 102 further comprises four vertical members 140 extending orthogonally from a reference plane formed by the base member 110 and/or a vertical structure can also be in the form of bearing wall panels that replace the vertical members 140. The four vertical members 140 may also be formed of HSS, and may have a generally rectangular profile. The vertical members 140 may form vertical edges of the module 102. The vertical members 140 may each be joined to an adjacent transverse member 144 and an adjacent longitudinal member 146 with the corner support members 160.

When joining two modules 102 together (or modules 103, and so on), a longitudinal joining member 150 may be used. The longitudinal joining member 150 may include a plurality of through holes 152 configured to receive fasteners that join to the captive fasteners 148. Similarly, when joining two modules together, a transverse joining member 162 may be used. The transverse joining member 162 may include a plurality of through holes 164 configured to receive fasteners that join to the captive fasteners 156. The joining member can also be used as a corridor support member and a means of transferring the drag from other structural members.

Upon joining two or more modules 102/103 together, a stairwell or an elevator shaft is formed. Initially and with reference to FIGS. 9 and 10, detailed views of engagement features for elevator components are illustrated.

Figure 9:
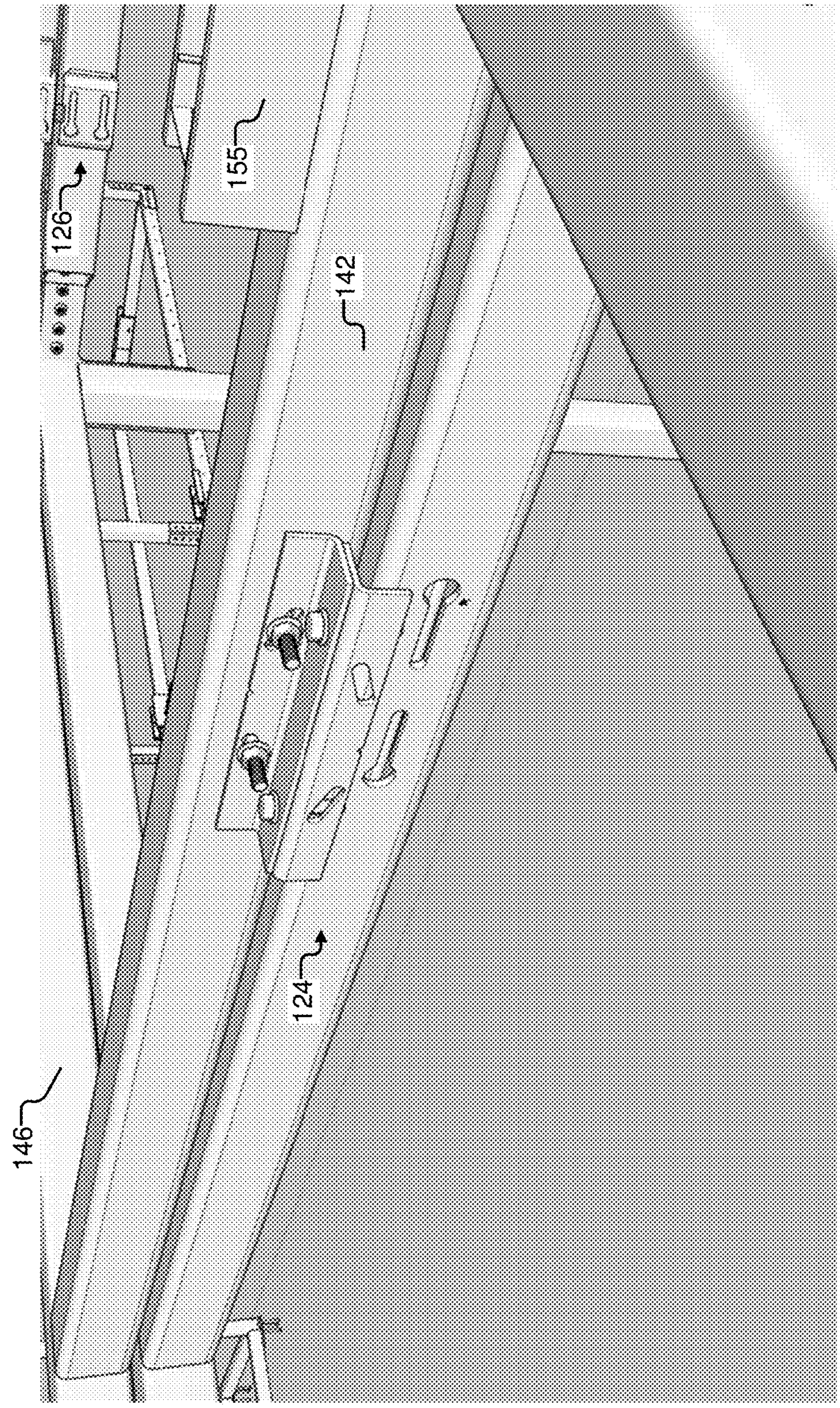
FIG. 9 is a detail view of a central support of a prefabricated stair/elevator module, in accordance with some implementations.

FIG. 9 is a detail view of a central support member 142 of a prefabricated stair/elevator module 102/103, in accordance with some implementations. As illustrated, engagement features 124, 126, and 155 are arranged to receive, engage, and retain elevator components. These engagement features may be formed differently depending upon any desired elevator system for building 20.

Figure 10:
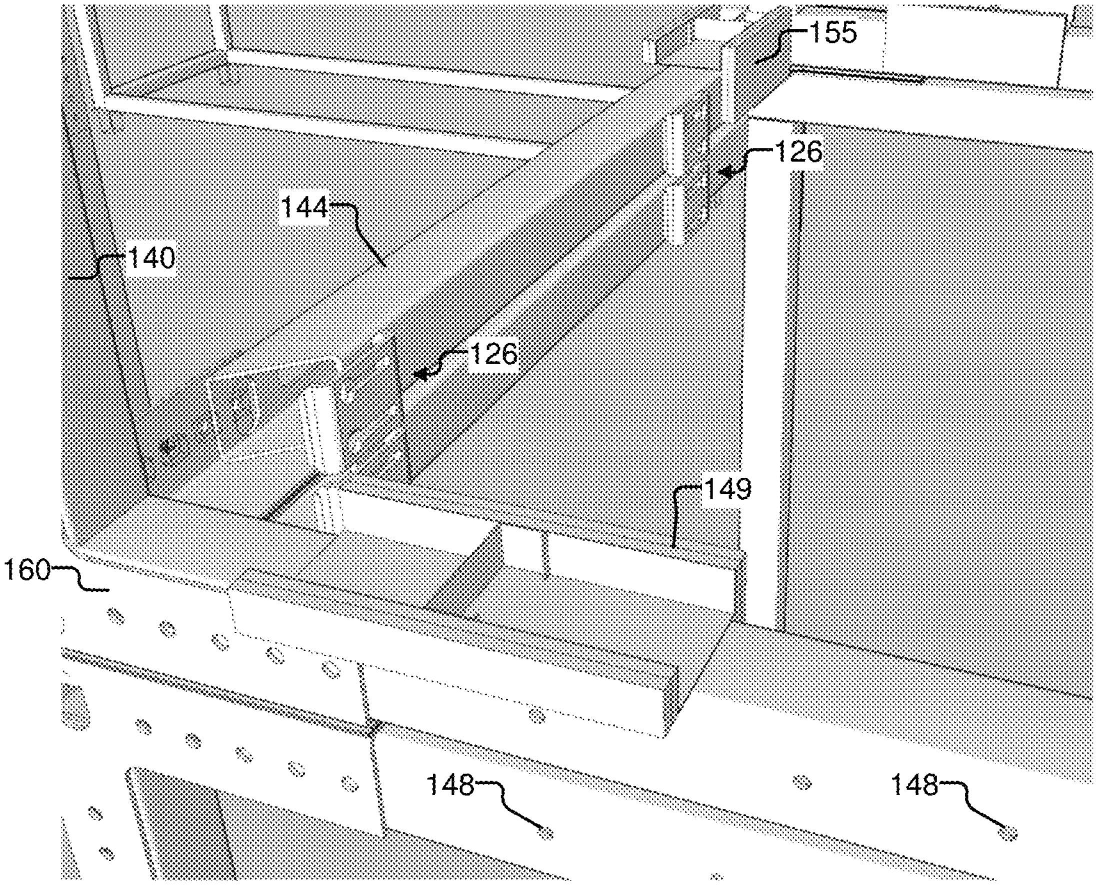
FIG. 10 is a detail view of a peripheral support of a prefabricated stair/elevator module, in accordance with some implementations.

FIG. 10 is a detail view of a transverse support member 144 of a prefabricated stair/elevator module 102/103, in accordance with some implementations. As illustrated, engagement features 126, 149, and 155 are arranged to receive, engage, and retain elevator components. These engagement features may be formed differently depending upon any desired elevator system for building 20.

Figure 11:
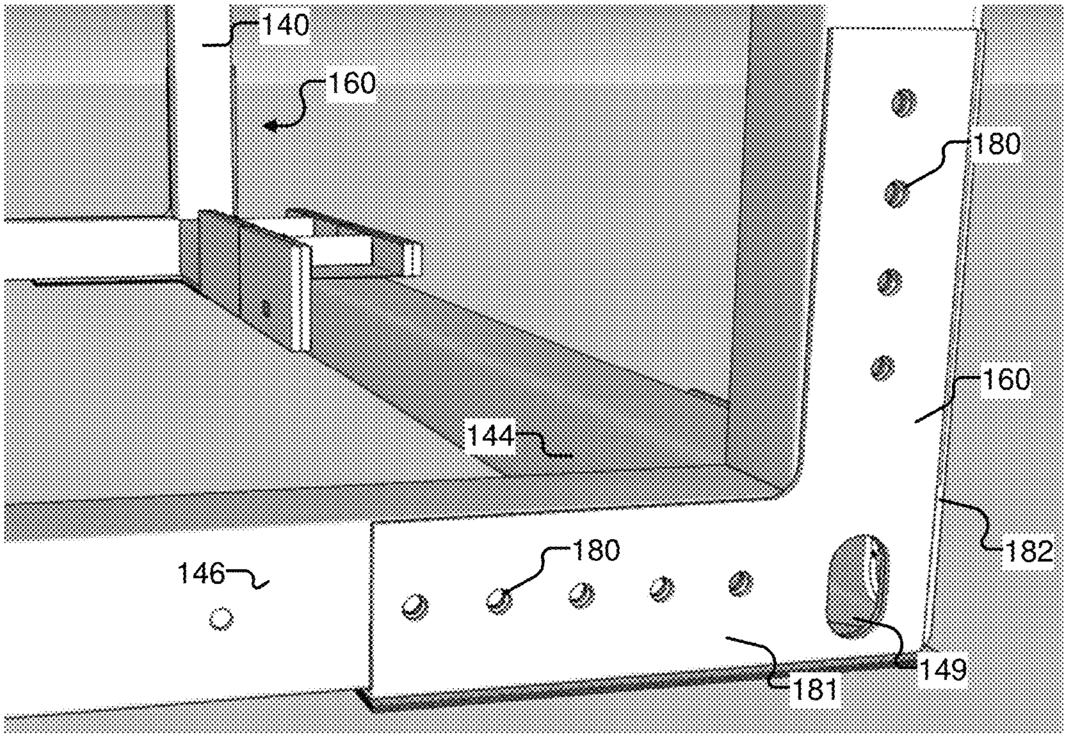
FIG. 11 is a detail view of a corner support member of a prefabricated stair/elevator module, in accordance with some implementations.
Figure 12:
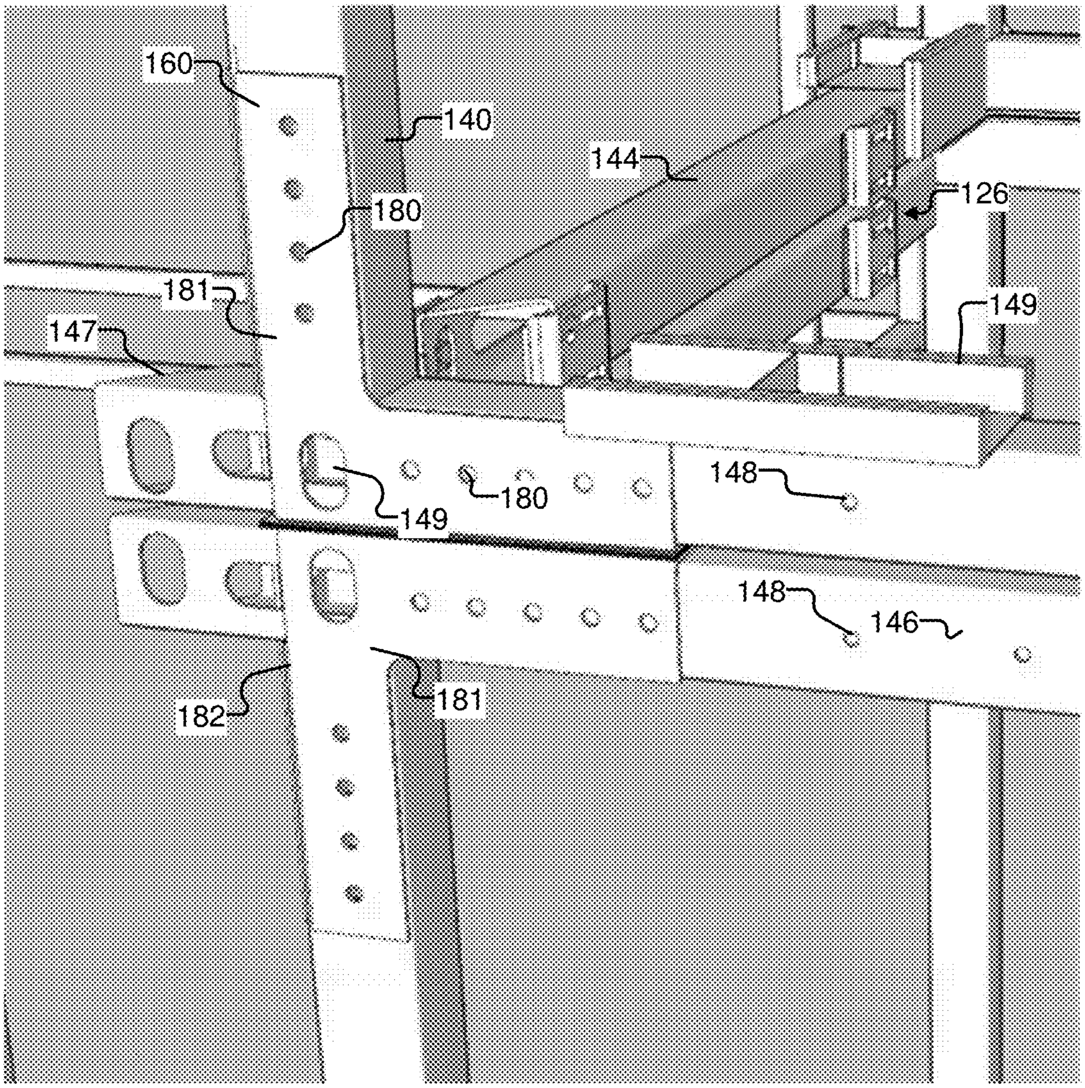
FIG. 12 is an additional view of a corner support member of a prefabricated stair/elevator module, in accordance with some implementations.
Figure 13:
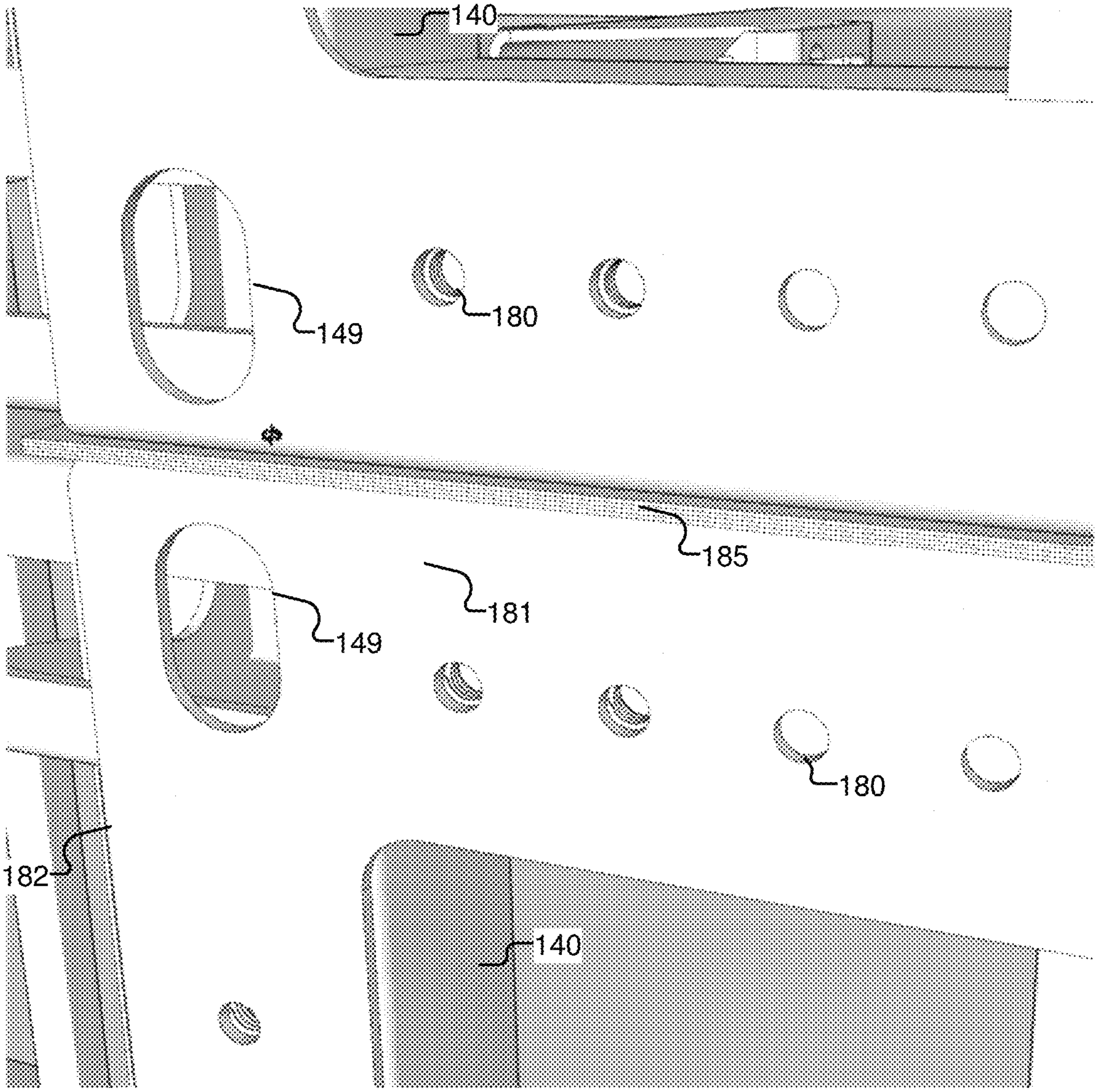
FIG. 13 is a detail view of a shim member of a prefabricated stair/elevator module, in accordance with some implementations.

Turning now to FIGS. 11-13, detailed views of corner support members 160 are provided.

FIG. 11 is a detail view of a corner support member 160 of a prefabricated stair/elevator module, FIG. 12 is an additional view of a corner support member of a prefabricated stair/elevator module, and FIG. 13 is a detail view of a shim member of a prefabricated stair/elevator module, in accordance with some implementations. As illustrated, each corner support member 160 comprises three L-brackets 181 arranged to mate with attachment holes 180 of each of the vertical members 140, transverse members 144, and longitudinal members 146. Each L-bracket may be formed of a flat piece of stamped steel and may define edges 182 that can be welded in some implementations. As further depicted, the lifting holes 149 are prominent and allow the lifting and movement of entire modules 102/103 from the factory to a transport bed, from a transport bed to a job-site, and within and about the job-site with relative ease. Furthermore, the corner support members 160 provide enough structural rigidity and bracing to allow this motion without damaging the modules 102/103. Moreover, a shim member 185 may be optionally fitted between modules 102/103, proximate the corner support member 160, such that level and plumb installations are possible even with small variances in construction and dimensions.

Figure 14:
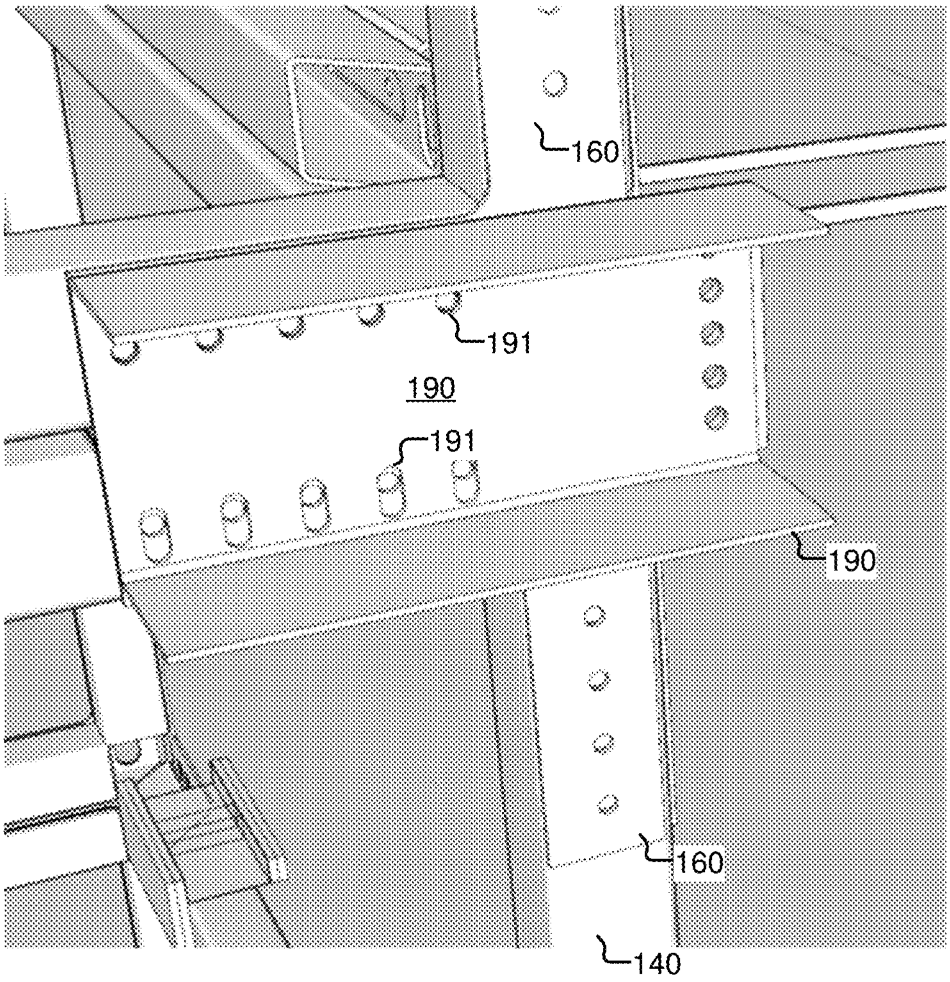
FIG. 14 is a detail view of a corner fastening member of a prefabricated stair/elevator module, in accordance with some implementations.

It is noted that additional fasteners may be used to attach modules 102/103 to one another. For example, FIG. 14 is a detail view of a corner fastening member 190 of a prefabricated stair/elevator module, in accordance with some implementations. The corner fastening member 190 may be placed directly onto the corner support members 160 of two adjacent modules 102/103, and fastened using attachment holes 191. In this manner, and through the use of fastening members 150 and 162 on the longitudinal and transverse members, respectively, the structural rigidity of the assembly 100 may be maintained.

As described above, the stair/elevator modules 102/103 may be stacked to form an elevator shaft or a stairwell. Hereinafter, a more detailed description of stair/elevator modules prefabricated to include stairwell components, rather than the elevator components described above, are presented in detail.

Figure 15:
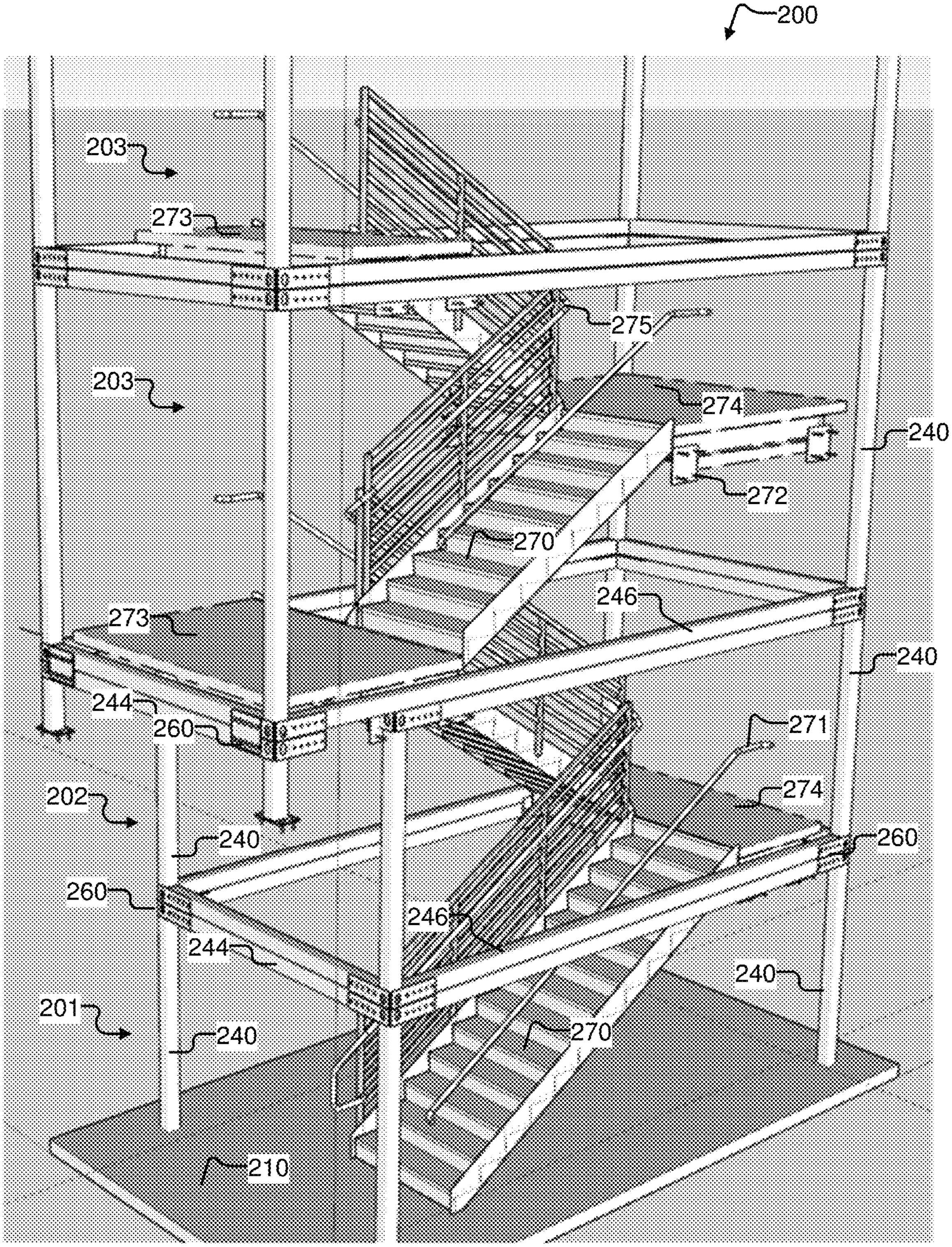
FIG. 15 is an axonometric view of an assembly of stair/elevator modules, in accordance with some implementations.

FIG. 15 is an axonometric view of an assembly of stair/elevator modules 201, 202 and 203, in accordance with some implementations. Initially, it is noted that a difference between stair modules 202 and 203 are relative dimensions and/or arrangement of internal components such as the staircase 270. As discussed in detail above in relation to elevator modules 102 and 103, these differences in dimensions do not functionally change characteristics of the modules, and instead offer different sized modules for differently arranged buildings, such as building 20. Accordingly, superfluous descriptions of components shared by modules 202 and 203 are omitted herein for the sake of brevity. Furthermore, it should be understood that any component arranged within module 201, 202, or 203 may also be arranged in another module, depending upon any desired implementation.

The stair/elevator module 201 comprises a base member 210 that may be formed of concrete, stone, metal, and/or any suitable material or combination of materials. The base member 210 is supportive of staircase 270 that may be fixedly attached thereto. The module 201 further comprises vertical members 240 extending orthogonally from a reference plane formed by the base member 210. Longitudinal members 246 and transverse members 244 are supported at upper distal ends of the vertical members 240 by corner support members 260. The corner support members 260 may be arranged similarly to support members 160, in some implementations. In some implementations, the support members 260 may be simplified brackets arranged to bolt onto exterior surfaces of the vertical members 240, transverse members 244, and longitudinal members 246.

The joined vertical members 240, transverse members 244, and longitudinal members 246 define an interior a stairwell having stair case 270, handrails 271, internal handrail 275, and landings 273 and 274 entirely supported within. For example, although not illustrated for clarity, framed walls may enclose the interior of the stairwell to provide vertical studs for attachment of the landings 274 through fasteners 272, as well as handrails 271. The framed walls may be formed through any desired technique, including with steel studs rising vertically and having finished or partially finished walls or treatments attached to interior surfaces thereof. Landings 273 may be fixedly attached to respective adjacent transverse members 244 and longitudinal members 246.

As illustrated, landings 274 are entirely interior to the modules 201, 202, and 203, and are internally supported therein. However, landings 273 are supported by transverse and longitudinal members, and form a new landing from which a base of stairwell 270 attaches. For example, an individual module 203 comprises staircase 270, landing 274, and a single landing 273 arranged at the top of the staircase 270. In this manner, the landing 273 forms a new base landing for the module 203 installed above, and so forth, such that base member 210 is the first landing, landing 274 is an internal landing, and landing 273 is a landing near the upper opening of the module 202/203. Therefore, when stacking in succession, the upper landing 273 forms a base member to which a new staircase 270 can be attached to.

Attachment of subsequent staircases 270 to existing landings 273 may be accomplished through slidably engaging features that are earthquake rated. These slidable engaging features may differ according to local building codes and regulations, but generally function to fixedly attach a base of the staircase 270 (e.g., bottom step) to the base of the landing 273 in a manner which does not allow removal.

Upon stacking a new module 203 upon a subsequent module, the arrangement 200 is formed up to a number of desired stories in the building 20. Furthermore, the assembly 200 is a freestanding structure, that is internally supportive of itself, allowing use by workers to travel up/down staircases 270 immediately upon installation. In this manner, the assembly 200 provides increased efficiency during construction as compared to conventional techniques.

Figure 16:
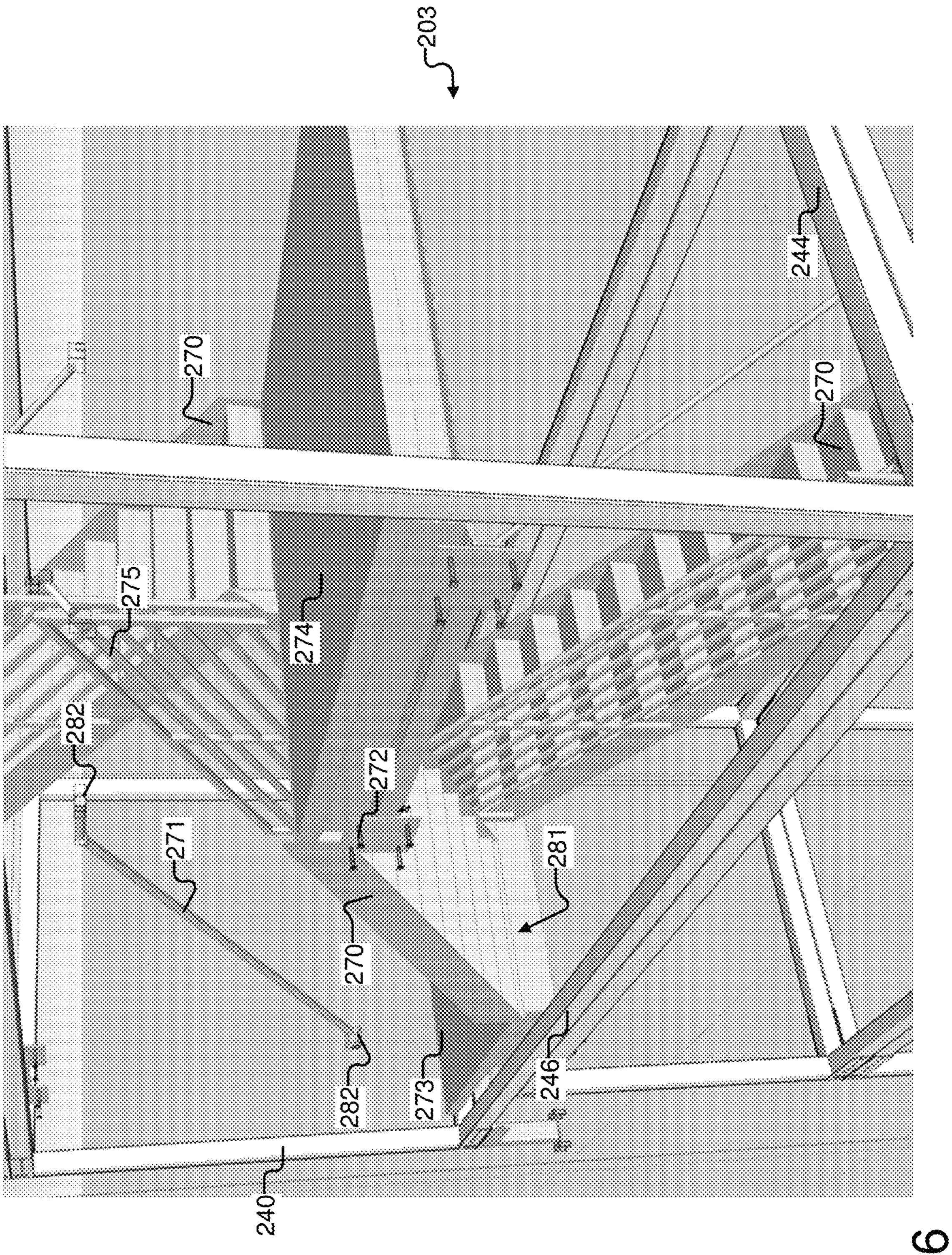
FIG. 16 is an axonometric view of a prefabricated stair/elevator module, in accordance with some implementations.
Figure 17:
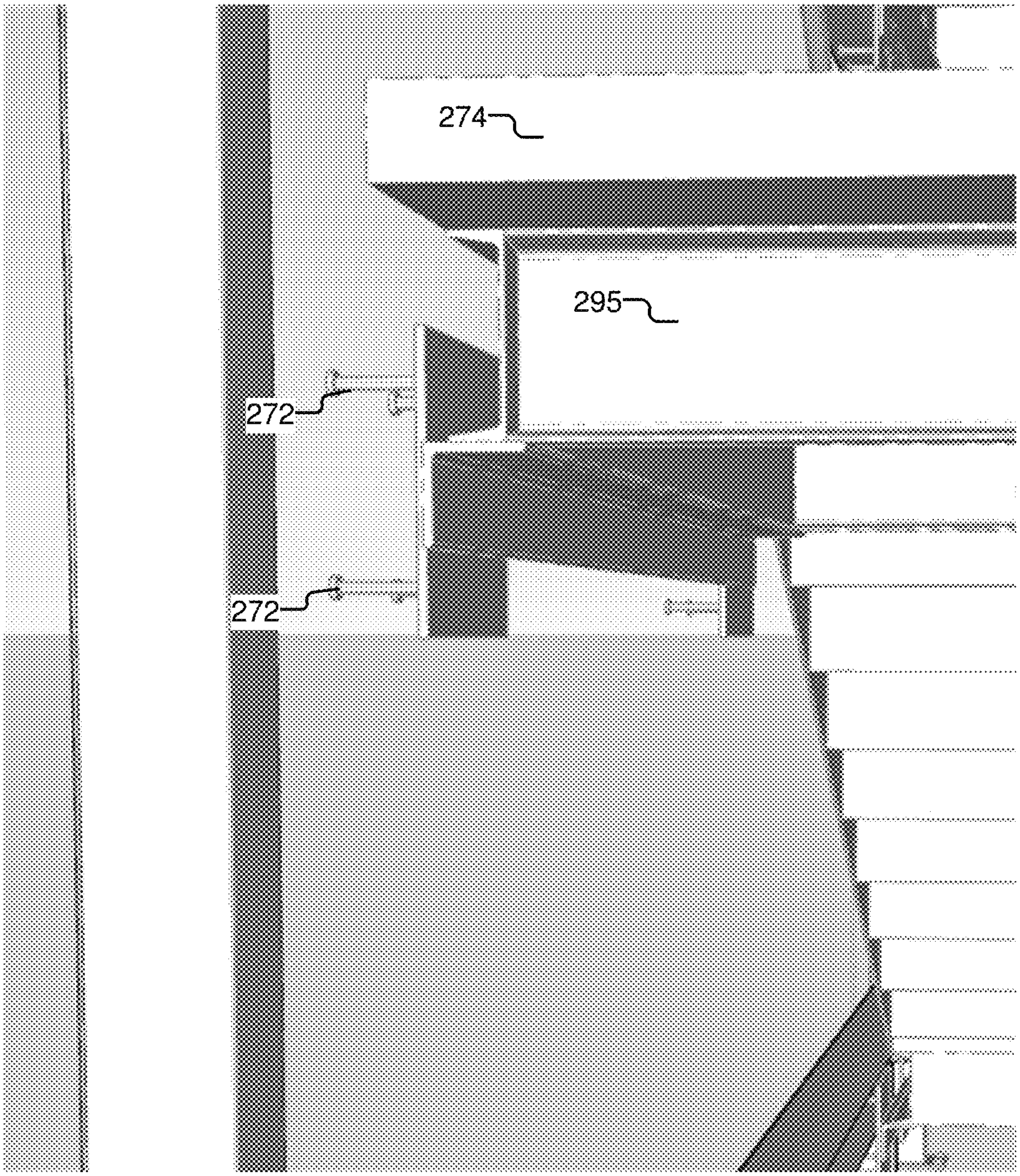
FIG. 17 is a detail view of a side panel of a prefabricated stair/elevator module, in accordance with some implementations.
Figure 18:
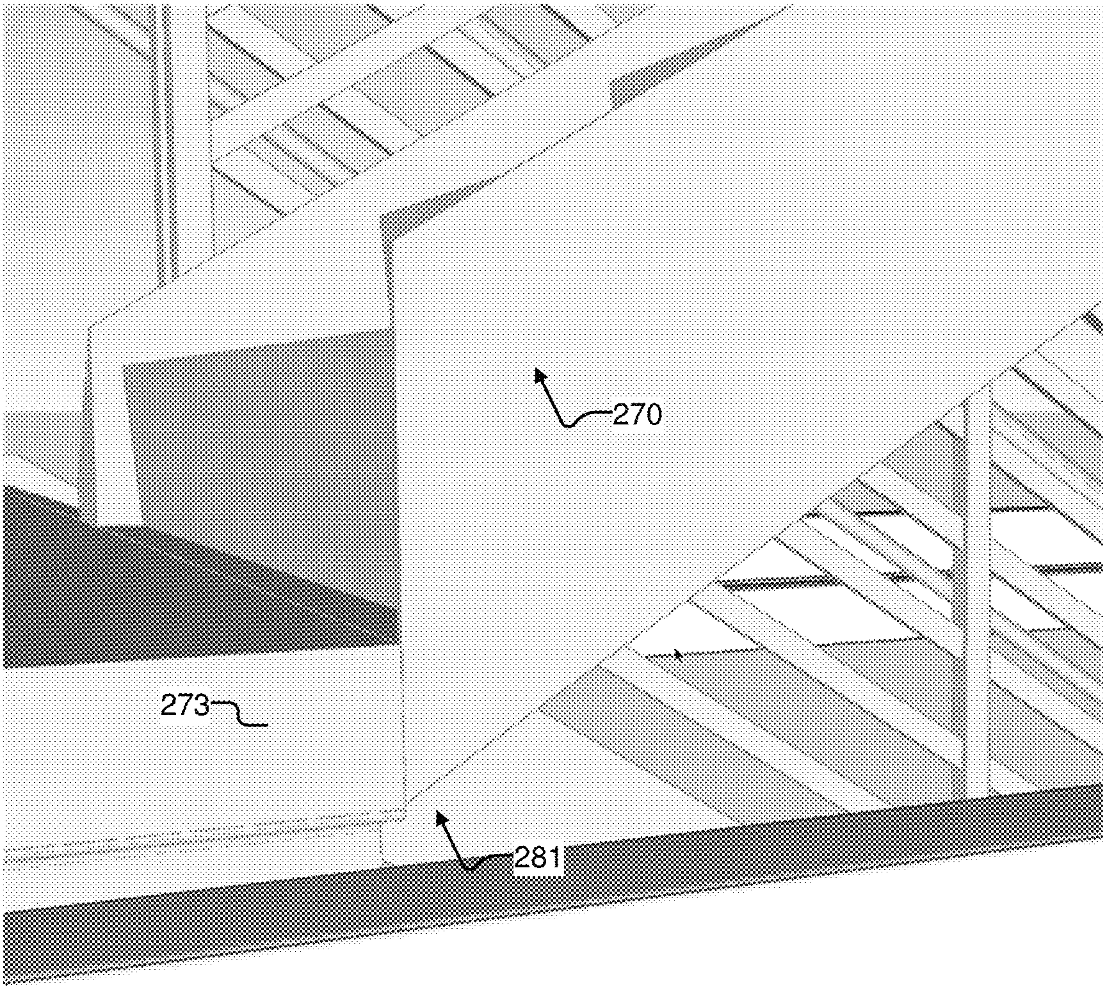
FIG. 18 is a detail view of a staircase portion of a prefabricated stair/elevator module, in accordance with some implementations.
Figure 19:
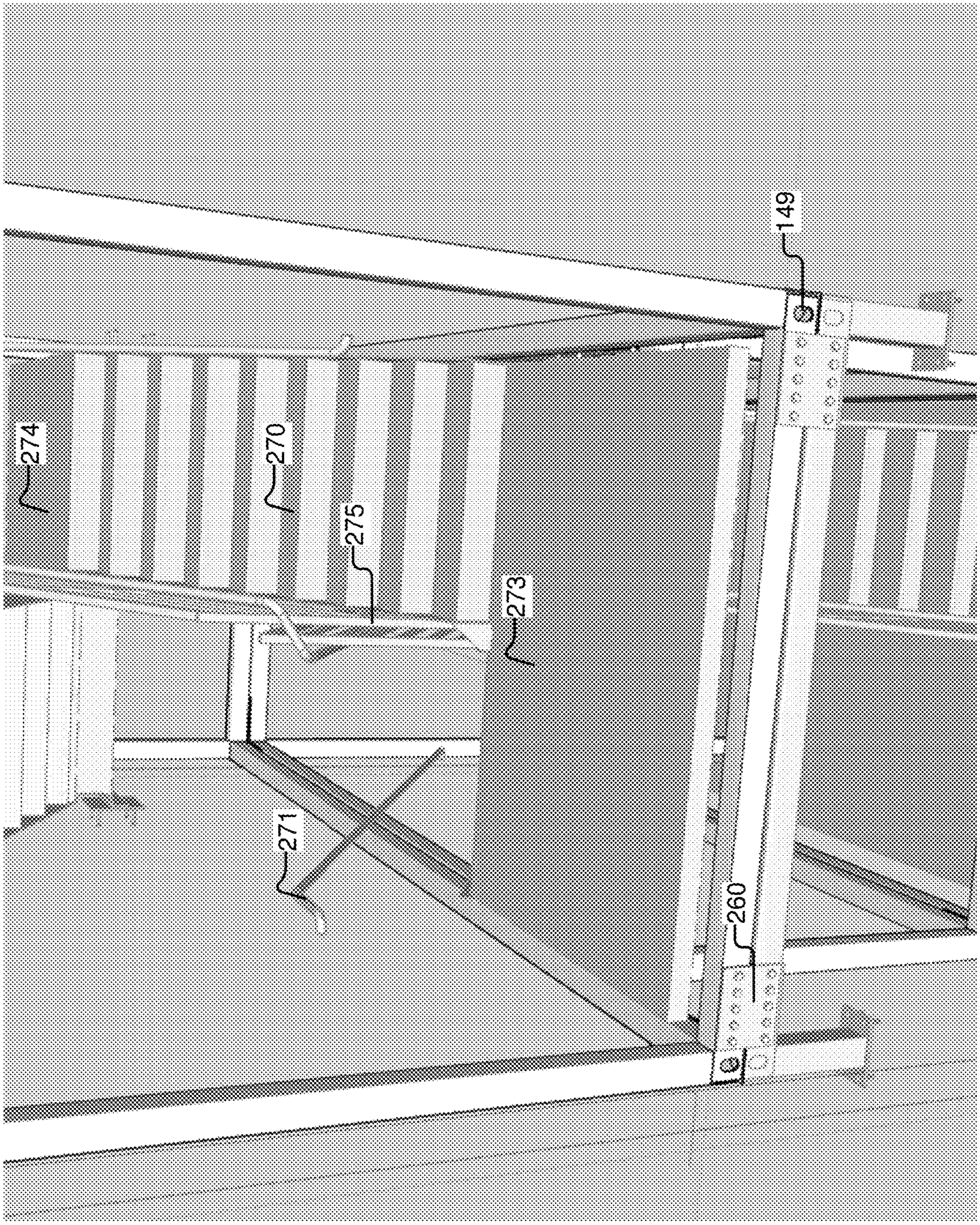
FIG. 19 is an interior view of a prefabricated stair/elevator module, in accordance with some implementations.
Figure 20:
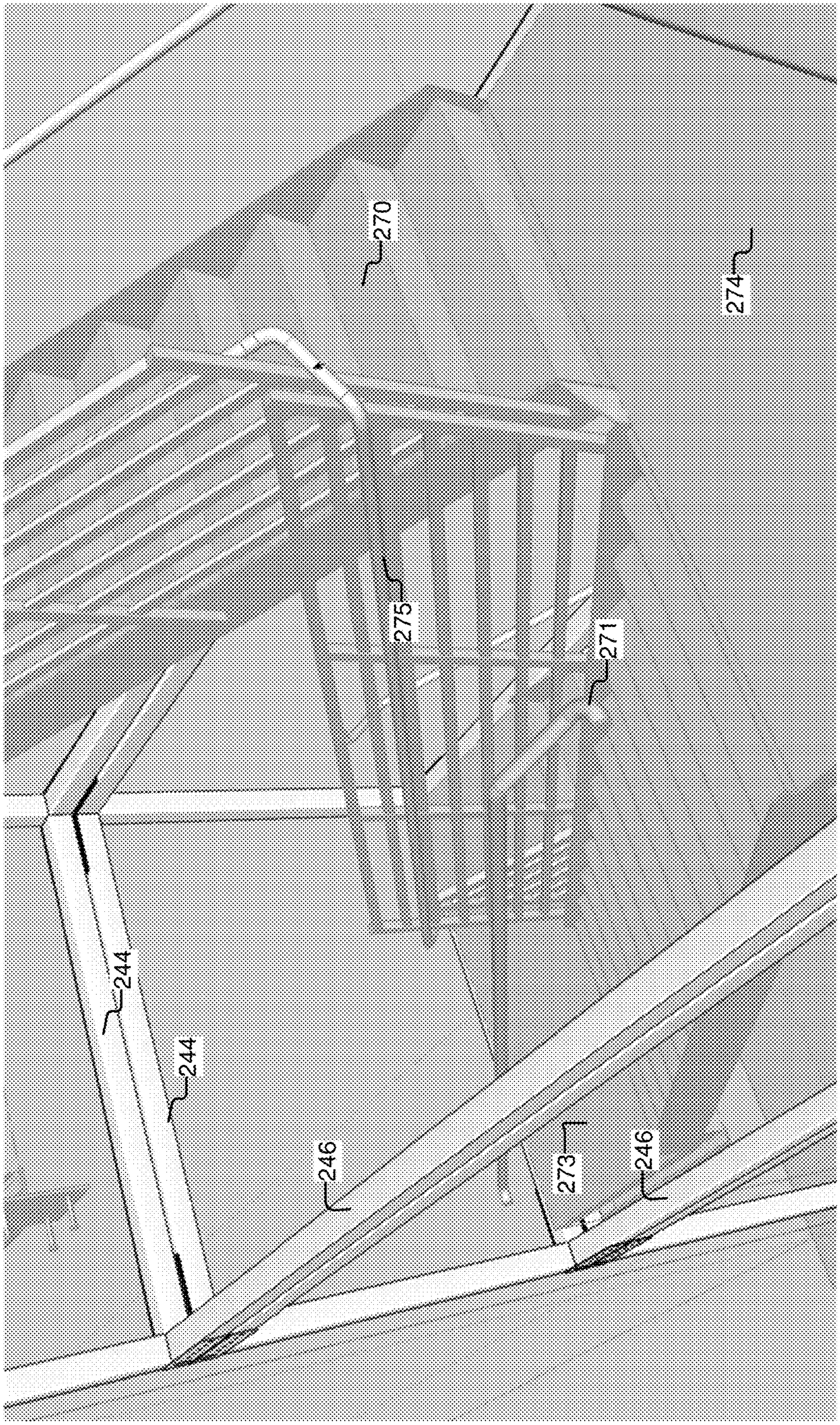
FIG. 20 is an alternate interior view of a prefabricated stair/elevator module, in accordance with some implementations.

FIG. 16 is an axonometric view of a prefabricated stair/elevator module 203, in accordance with some implementations. As illustrated, the stair/elevator module 203 comprises staircase 270, interior landing 274 fixedly attached to wall panels through fasteners 272, handrail 271 fixedly attached to the wall panels through additional fasteners 282, and internal handrail 275 fixedly attached to the staircase 270 and landing 274. This is illustrated from a different viewpoint in FIG. 17 and FIG. 20. For example, as illustrated, a transverse staircase support member 295 extends between wall panels to support both the staircase 270 and the landing 274 with fasteners 272.

Landing 273 is illustrated as being supported by an additional module directly beneath module 203. This is illustrated from an alternative viewpoint at FIG. 19. Accordingly, an additional landing 273 is fixedly attached above staircase 270 to wall panels and/or transverse and longitudinal members with fasteners. As further shown, staircase 270 slidably engages with the landing 273 from the below module, using engagement features 281. These engaging features 281 may differ according to local building codes and regulations, but generally function to fixedly attach the base of the staircase 270 (e.g., bottom step) to the base of the landing 273 (of the below module) in a manner which does not allow removal. This is illustrated from an alternate viewpoint in FIG. 18.

Figure 21A:
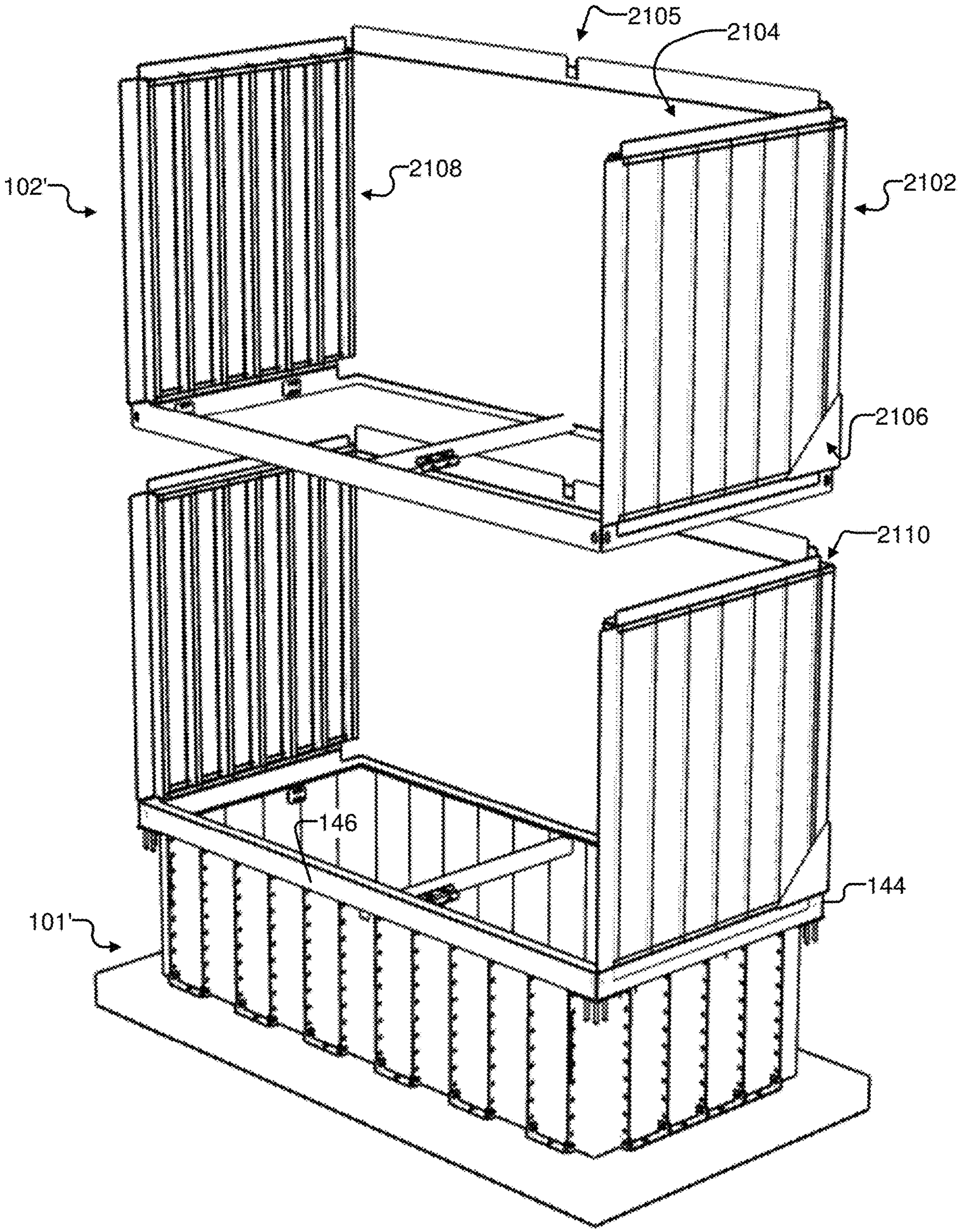
FIGS. 21A and 21B illustrate alternative vertical structural componentry of a prefabricated stair/elevator module, in accordance with some implementations.
Figure 21B:
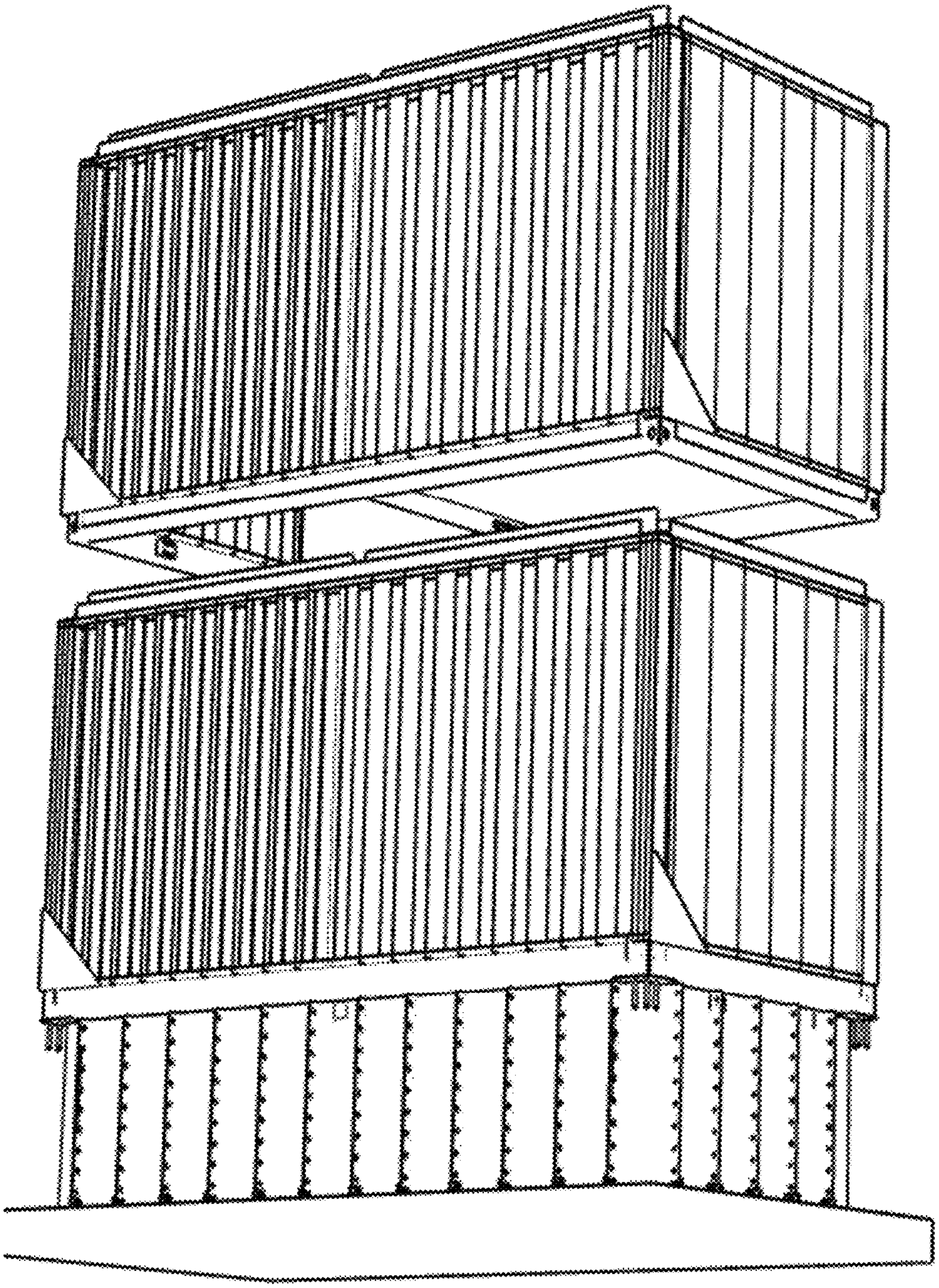

Turning now to FIGS. 21A and 21B, alternative vertical structural componentry of a prefabricated stair/elevator module is illustrated. It is noted that a difference (among other differences) between the illustrated modules 101', 102' as compared to the above description, includes the replacement of four vertical members 140 with four vertical load bearing panels 2102, 2104. An additional load bearing panel (not shown) may be used at the forefront of these modules so as to allow mounting of elevator doors, stairwell doors, and other ingress/egress options.

Each vertical load bearing panel may include a plurality of parallel studs 2108 arranged to support all modules stacked above the representative module. Furthermore, a notched cutout 2105 is included in at least one panel 2104 (and including the non-illustrated front panel with doors/elevator doors) so as to allow stacking and accommodation of the central support member of elevator modules.

Corner support braces 2106 may be fixedly attached near or proximal to corner portions of at least some of the vertical load bearing panels. An upper edge 2110 of the vertical load bearing panels may receive and support a module as it is stacked upon an associated module. The upper edge 2110 may include one or more flanges for alignment and creation of a relatively continuous elevator shaft and/or stairwell.

It should be readily understood that prefabricated stair/elevator modules 101, 102, 103, 101', and 102' may be interchangeably used in building construction. For example, module 101 may be installed at a jobsite. Thereafter, prefabricated stair/elevator module 102' may be stacked thereupon (and additional modules stacked thereon) so as to create a functioning elevator shaft utilizing different types of prefabricated stair/elevator modules.

Figure 22A:
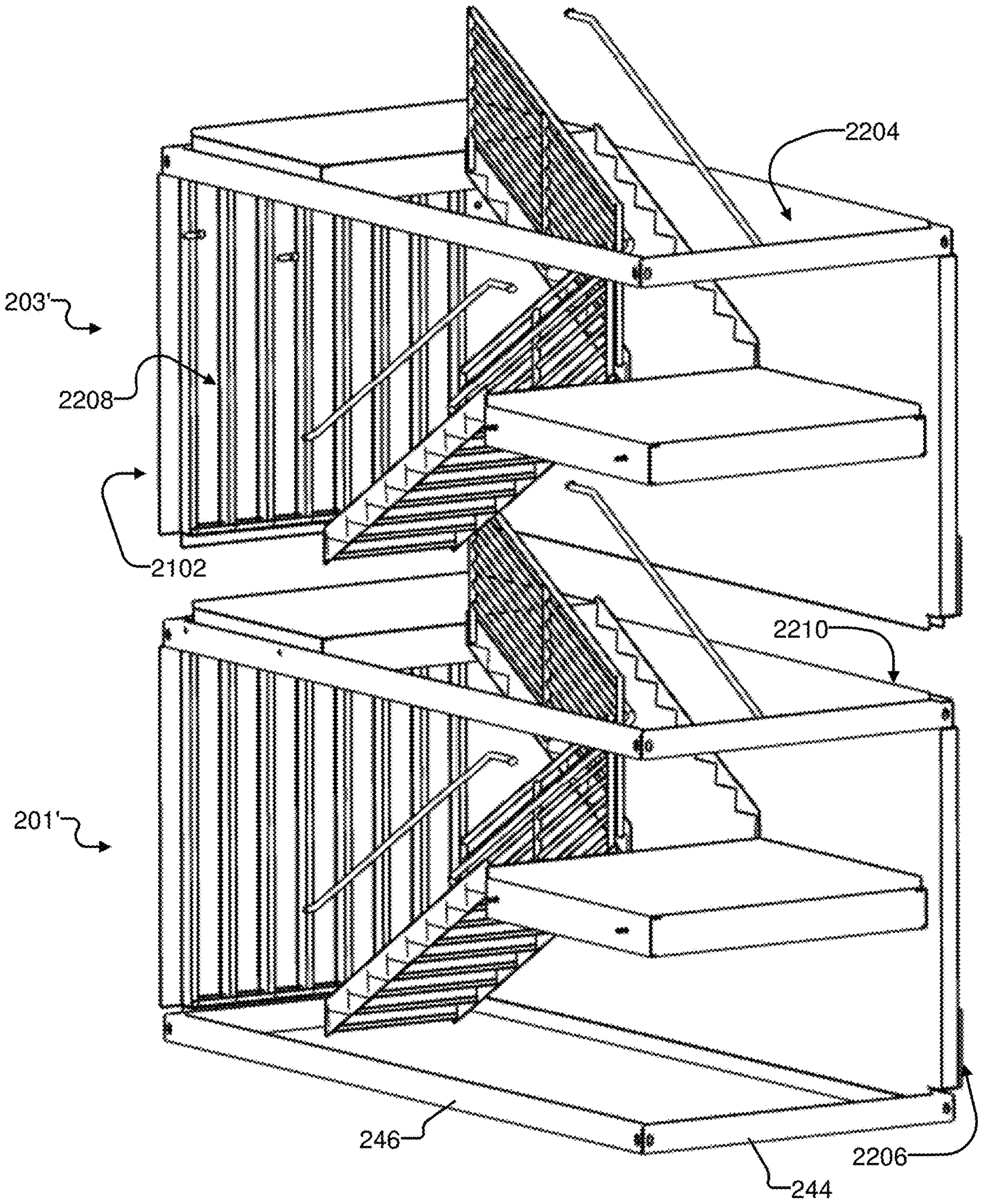
FIGS. 22A and 22B illustrate alternative vertical structural componentry of a prefabricated stair/elevator module, in accordance with some implementations
Figure 22B:
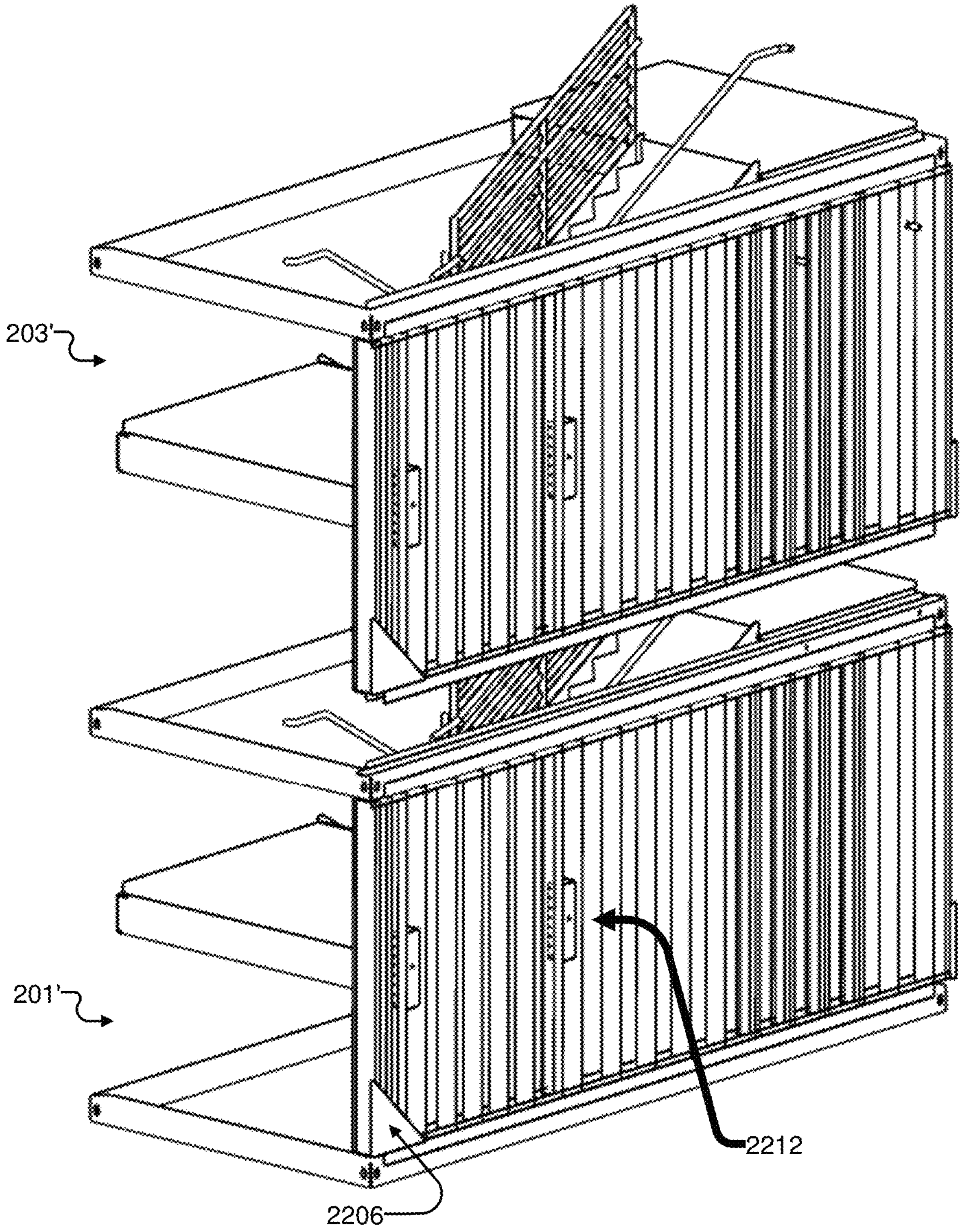

Referring to FIGS. 22A and 22B, alternative vertical structural componentry of a prefabricated stair/elevator module is illustrated. It is noted that a difference (among other differences) between the illustrated modules 201', 203' as compared to the above description, includes the replacement of four vertical members 240 with four vertical load bearing panels 2202, 2204. An additional load bearing panel (not shown) may be used at the forefront of these modules so as to allow mounting of elevator doors, stairwell doors, and other ingress/egress options. An additional vertical load bearing panel 2102 (not shown) may also be used to close off a side portion of the stair/elevator module.

Each vertical load bearing panel may include a plurality of parallel studs 2208 arranged to support all modules stacked above the representative module.

Corner support braces 2206 may be fixedly attached near or proximal to corner portions of at least some of the vertical load bearing panels. An upper edge 2210 of the vertical load bearing panels may receive and support a module as it is stacked upon an associated module. The upper edge 2210 may include one or more flanges for alignment and creation of a relatively continuous elevator shaft and/or stairwell. Stairwell landing anchors 2212 may be formed of steel and included within two/three of the vertical load bearing panels, and may be arranged to receive fasteners to securely attach stairwell landings to the proximal/adjacent load bearing panels of the finished module. For example, a stairwell landing may be fixedly attached to anchors 2212, which are each in turn fixedly attached within an interior portion of three vertical load bearing panels that are adjacent to the stairwell landing. Additionally, as illustrated, each module is a self-contained staircase having an upper landing ready to receive and engage with a low step of a new module stacked thereupon.

It should be readily understood that prefabricated stair/elevator modules 201, 202, 203, 201', and 202' may be interchangeably used in building construction. For example, module 201 may be installed at a jobsite. Thereafter, prefabricated stair/elevator module 202' may be stacked thereupon (and additional modules stacked thereon) so as to create a functioning stairwell utilizing different types of prefabricated stair/elevator modules.

Furthermore, it is noted that while one module is illustrated as having a peripheral steel support ring near a bottom portion of a module (see FIG. 21A), and another module is illustrated as having a peripheral steel support ring near an upper portion of a module (see FIG. 22A), the same may be varied such that the peripheral steel support rings are formed on opposite ends of respective modules. Other modifications and variations are also applicable.

As described in detail above, a building includes a prefabricated modular stair or elevator module. The prefabricated stair or elevator module may form either a fully functional stairwell with an internally supported internal landing and handrails, or a fully functional elevator shaft ready to install an elevator system through a plurality of engagement features.

Each prefabricated stair/elevator module includes four vertical members extending orthogonally from a reference plane (or vertical loadbearing wall panels, FIGS. 21-22), four transverse members forming transverse edges of the module, and four longitudinal members forming longitudinal edges of the module. The prefabricated modules may be stacked upon one another and fixedly attached to one another through fastening members and fasteners. Furthermore, each module may be covered in wall panels (or use the variation of load bearing wall panels, see FIGS. 21-22) such that each module forms a segment of either an elevator shaft or a stairwell. The wall panels are also prefabricated, and may be covered in any suitable material.

The present disclosure is not to be limited in terms of the particular embodiments described in this application, which are intended as illustrations of various aspects. Many modifications and embodiments can be made without departing from its spirit and scope. Functionally equivalent methods and apparatuses within the scope of the disclosure, in addition to those enumerated herein, are possible from the foregoing descriptions. Such modifications and embodiments are intended to fall within the scope of the appended claims. The present disclosure is to be limited only by the terms of the appended claims, along with the full scope of equivalents to which such claims are entitled. This disclosure is not limited to particular methods, which can, of course, vary. The terminology used herein is for the purpose of describing particular embodiments only, and is not intended to be limiting.

With respect to the use of substantially any plural and/or singular terms herein, the terms can be translated from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

If a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). Virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, the disclosure is also thereby described in terms of any individual member or subgroup of members of the Markush group.

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 items refers to groups having 1, 2, or 3 items. Similarly, a group having 1-5 items refers to groups having 1, 2, 3, 4, or 5 items, and so forth.

The herein described subject matter sometimes illustrates different components contained within, or connected with, different other components. Such depicted architectures are merely embodiments, and in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific embodiments of operably couplable include but are not limited to physically mateable and/or physically interacting components.

While various aspects and embodiments have been disclosed herein, other aspects and embodiments are possible. The various aspects and embodiments disclosed herein are for purposes of illustration and are not intended to be limiting.

What is claimed is:

1. A prefabricated stairwell and elevator shaft module, comprising:

four vertical members arranged orthogonal to a reference ground plane based on a foundation of a multi-story building;

four transverse members fixedly attached to upper and lower distal ends of the four vertical members with corner support members; and four longitudinal members fixedly attached to the upper and lower distal ends of the four vertical members with the corner support members, wherein the four vertical members, four transverse members, and four longitudinal members form side edges of the module and define an interior space, wherein the module is configured to form a segment of one or more of an elevator shaft and a stairwell within the interior space, the segment having a height corresponding to a single story of the multi-story building, the segment configured to communicate between stories of the multi-story building, and the segment being a self-supporting structure, wherein at one of the side edges of the module, the four longitudinal members have oblique distal ends that extend past the corner support members to form a space dimensioned for elevator system components, and wherein the corner support members and the oblique distal ends of the four longitudinal members each comprise at least one anchor hole configured to receive and engage with a lifting hook for lifting and placement of the prefabricated stairwell and elevator shaft module at a construction site for the multi-story building.

2. The prefabricated stairwell and elevator shaft module of claim 1, wherein the prefabricated stairwell and elevator shaft module is prefabricated at a manufacturing facility separate from the construction site for the multi-story building.

3. The prefabricated stairwell and elevator shaft module of claim 1, wherein the segment of the elevator shaft comprises one or more engagement features configured to engage and retain the elevator system components.

4. The prefabricated stairwell and elevator shaft module of claim 3, wherein the elevator system components comprise at least one elevator rail or at least one elevator counterweight.

5. The prefabricated stairwell and elevator shaft module of claim 1, wherein at a corner of the module:

two of the corner support members comprise first and second flat L-brackets, the first flat L-bracket is configured to attach to exterior surfaces of a proximate vertical member of the four vertical members and a proximate transverse member of the four transverse members, and the second flat L-bracket is configured to attach to exterior surfaces of the proximate vertical member of the four vertical members and a proximate longitudinal member of the four longitudinal members.

6. The prefabricated stairwell and elevator shaft module of claim 1, wherein the prefabricated stairwell and elevator shaft module is a first module, and wherein the first module is configured to align with and stack upon a second prefabricated stairwell and elevator shaft module.

7. The prefabricated stairwell and elevator shaft module of claim 6, wherein the first module is configured to attach to the second module with one or more transverse support members, and wherein each transverse support member is formed from a continuous piece of metal having through holes formed therein.

8. The prefabricated stairwell and elevator shaft module of claim 6, wherein the first module is configured to attach to the second module with one or more longitudinal joining members, and wherein each longitudinal joining member is formed from a continuous piece of metal having through holes formed therein that are configured to receive fasteners that join with corresponding longitudinal members of the second module and of the first module stacked upon the second module.

9. The prefabricated stairwell and elevator shaft module of claim 6, wherein the first module is configured to attach to the second module with one or more corner fastening members, and wherein each corner fastening member is formed from a continuous piece of metal having through holes formed therein.

10. The prefabricated stairwell and elevator shaft module of claim 1, wherein the segment of the stairwell comprises the interior space which is configured to retain and support one or more stairwell components comprising:

a first stair landing;

a second stair landing;

a first handrail;

a second handrail; and at least two staircases, wherein a first staircase of the at least two staircases is joined with the first landing, and a second staircase of the at least two staircases is joined with the second landing.

11. The prefabricated stairwell and elevator shaft module of claim 10, wherein the second stair landing is configured to join and be supportive of a staircase from an adjacent prefabricated stairwell and elevator shaft module configured to align with and stack upon the prefabricated stairwell and elevator shaft module.

12. The prefabricated stairwell and elevator shaft module of claim 11, further comprising four side wall panels fixedly attached to the side edges formed by the four vertical members, four transverse members, and four longitudinal members, wherein the four side wall panels are configured to support the one or more stairwell components with fasteners.

13. The prefabricated stairwell and elevator shaft module of claim 12, wherein the four side wall panels comprise one or more vertical studs arranged to receive the fasteners from the one or more stairwell components.

14. The prefabricated stairwell and elevator shaft module of claim 13, further comprising a base member arranged substantially parallel to the reference ground plane and formed of concrete, wherein the base member is arranged to support a bottom riser of a first step of the first staircase.

15. The prefabricated stairwell and elevator shaft module of claim 13, wherein the second stair landing is fixedly attached with fasteners to at least two longitudinal members of the four longitudinal members and one transverse member of the four transverse members.

16. A multi-story building, comprising:

one or more levels formed from prefabricated interior and exterior panels and substantially parallel to a reference ground plane defined by a foundation;

a first prefabricated stairwell and elevator shaft module configured to be adjacent to at least one level of the one or more levels, the first prefabricated stairwell and elevator shaft module comprising:

four vertical members arranged orthogonal to the ground plane;

four transverse members fixedly attached to upper and lower distal ends of the four vertical members with corner support members; and four longitudinal members fixedly attached to upper and lower distal ends of the four vertical members with the corner support members, wherein the four vertical members, four transverse members, and four longitudinal members form side edges of the first module and define an interior space, wherein the first module is configured to form a segment of one or more of an elevator shaft and a stairwell within the interior space, the segment having a height corresponding to a single level of the one or more levels, the segment configured to communicate between levels of the multi-story building, and the segment being a self-supporting structure, and wherein the corner support members each comprise at least one anchor hole configured to receive and engage with a lifting hook for lifting and placement of the prefabricated stairwell and elevator shaft module at a construction site for the multi-story building prior to installation of the prefabricated interior and exterior panels; and a second prefabricated stairwell and elevator shaft module, wherein the first module is configured to align with and stack upon the second module, wherein the first module is configured to attach to the second module with one or more longitudinal joining members, wherein each longitudinal joining member is formed from a continuous piece of metal having through holes formed therein that are configured to receive fasteners that join with corresponding longitudinal members of the second module and of the first module stacked upon the second module, and wherein:

the segment of the elevator shaft comprises one or more engagement features configured to engage and retain elevator system components, at one of the side edges of the first module, the four longitudinal members have oblique distal ends that extend past the corner support members to form a space dimensioned for the elevator system components, and the elevator system components comprise at least one elevator rail or at least one elevator counterweight.

17. The multi-story building of claim 16, wherein:

the first module is further configured to attach to the second module with one or more transverse support members, wherein each transverse support member is formed from a continuous piece of metal having through holes formed therein, and the first module is further configured to attach to the second module with one or more corner fastening members, wherein each corner fastening member is formed from a continuous piece of metal having through holes formed therein.

18. The multi-story building of claim 16, further comprising at least one prefabricated elevator pit directly beneath the second prefabricated stairwell and elevator shaft module and attached thereto, wherein the prefabricated elevator pit and the first and second prefabricated stairwell and elevator shaft modules are prefabricated at a manufacturing facility separate from the construction site for the multi-story building.

19. The multi-story building of claim 16, wherein the segment of the stairwell comprises the interior space which is configured to retain and support one or more stairwell components comprising:

a first stair landing;

a second stair landing;

a first handrail;

a second handrail;

at least two staircases, wherein a first staircase of the at least two staircases is joined with the first landing, and a second staircase of the at least two staircases is joined with the second landing; and a base member arranged substantially parallel to the reference ground plane and formed of concrete, wherein the base member is arranged to support a bottom riser of a first step of the first staircase.

* * * * *